(12) United States Patent
Honda

(10) Patent No.: US 7,120,612 B2
(45) Date of Patent: Oct. 10, 2006

(54) METHOD AND APPARATUS FOR RECOMMENDING AN OPTIMUM TRAINING TO A TRAINEE, AND A COMPUTER PRODUCT

(75) Inventor: Kazuaki Honda, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 372 days.

(21) Appl. No.: 09/789,520

(22) Filed: Feb. 22, 2001

(65) Prior Publication Data
US 2002/0046202 A1    Apr. 18, 2002

(30) Foreign Application Priority Data
Aug. 31, 2000  (JP) ............... 2000-264577

(51) Int. Cl.
G06F 17/00  (2006.01)
G06F 17/20  (2006.01)

(52) U.S. Cl. .............. 706/11; 706/12; 706/45
(58) Field of Classification Search ........... 706/11, 706/12, 45; 434/322
See application file for complete search history.

(56) References Cited

U.S. PATENT DOCUMENTS 5,893,717 A * 4/1999 Kirsch et al. ............. 434/118

2003/0059759 A1 * 3/2003 Calhoun et al. ............ 434/322

FOREIGN PATENT DOCUMENTS

| JP | 02-143289 | 6/1990 |
|----|-----------|--------|
| JP | 04-179984 | 6/1992 |
| JP | 08-110752 | 4/1996 |
| JP | 2856406   | 11/1998 |

OTHER PUBLICATIONS

Japanese Office Action mailed Jul. 29, 2005 in corresponding Japanese Patent Application No. 2000-264577.

* cited by examiner

*Primary Examiner*—Joseph P. Hirl
(74) *Attorney, Agent, or Firm*—Staas & Halsey LLP

(57) ABSTRACT

The apparatus for recommending an optimum training is provided with a standard model database which stores standard value information of standard skill corresponding to a standard talent image, and a skill/training correspondence database which stores training information corresponding to the standard value information. Furthermore, a questionnaire response section and a test response section collect skill information of a trainee in a question and answer format, via on-line. Then, a skill analysis section objectively analyzes the skill and talent image of the trainee, based on the comparison result of the standard value information and the skill information. Finally, a training selection section selects training information that suits to the trainee from the skill/training correspondence database as the optimum training recommendation information, based on the result of analysis by the skill analysis section.

3 Claims, 27 Drawing Sheets

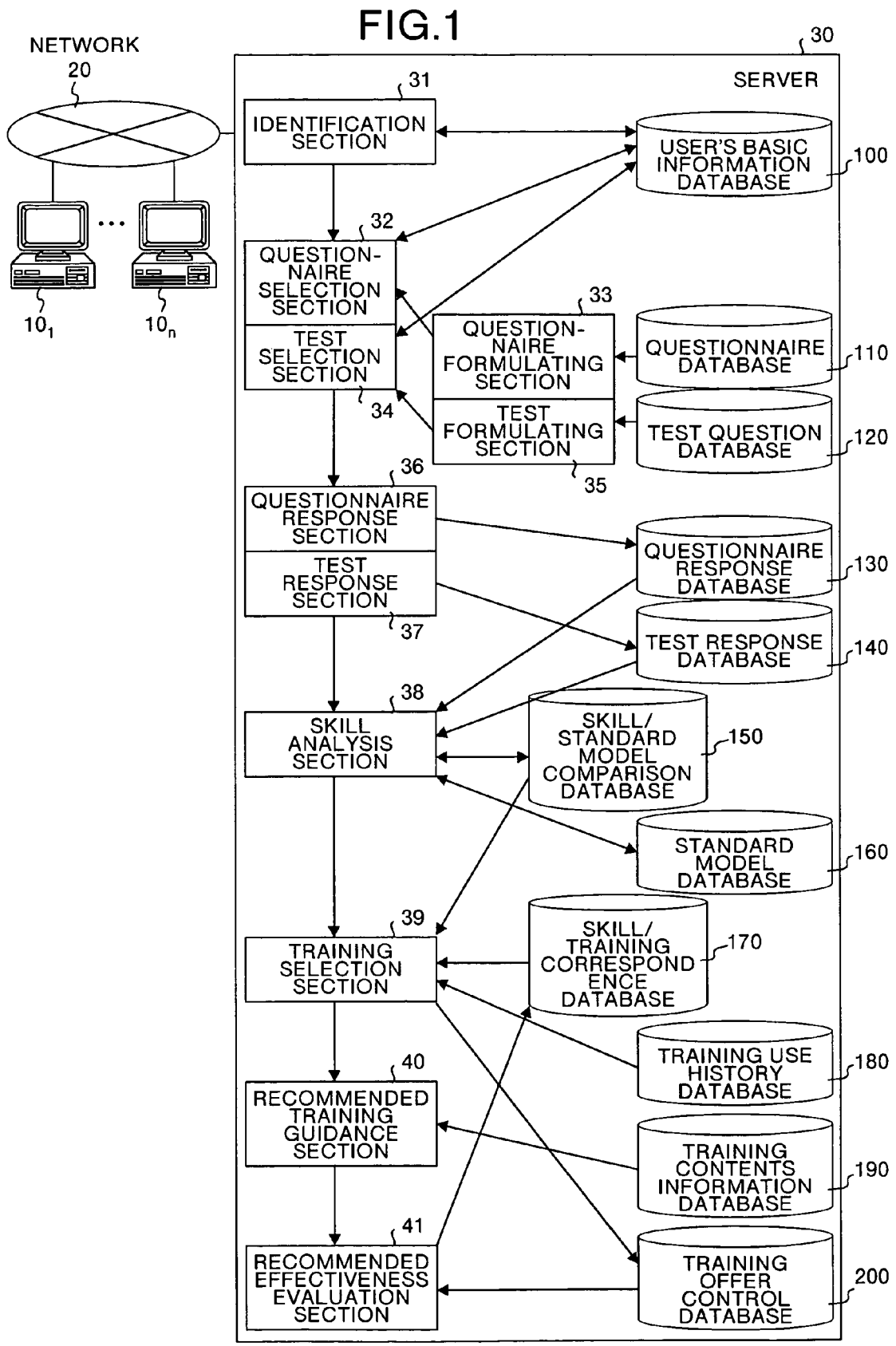

FIG.2A
USER'S BASIC INFORMATION DATABASE /100

| SECTION CODE | SECTION NAME | EMPLOYEE NUMBER | NAME | PASSWORD | DUTY CODE |
|---|---|---|---|---|---|
| 0011 | PATENT SECTION III | 111111 | ICHIRO FUJITSU | AAAA | 01 |
| 1111 | TRAINING SECTION III | 123456 | TARO FUJITSU | XXXX | 02 |

| SKILL A QUESTIONNAIRE - LATEST RESPONSE DATE | SKILL A TEST - LATEST RESPONSE DATE | ... | SKILL N TEST - LATEST RESPONSE DATE |
|---|---|---|---|
| 20000105 | 00000000 (NOT RESPONDED) | ... | 00000000 (NOT RESPONDED) |
| 20000722 | 20000722 | ... | 20000722 |

FIG.2B
110 QUESTIONNAIRE DATABASE

| QUESTION CODE | DUTY CODE | SKILL CODE | SKILL ELEMENT CODE | TEXT |
|---|---|---|---|---|
| 0102CK01 | 02 | SKILL C | EXPERIENCE | ELECTRICAL COMMUNICATION RULE, ETC.··· |
| 0100AC99 | 00 (COMMON) | SKILL A | KNOWLEDGE | PROCEDURE OF PATENT APPLICATION ··· |

FIG.2C
120 TEST QUESTION DATABASE

| QUESTION CODE | DUTY CODE | SKILL CODE | SKILL ELEMENT CODE | TEXT | CORRECT ANSWER FLAG |
|---|---|---|---|---|---|
| 0202CC01 | 02 | SKILL C | KNOWLEDGE | SMTP IS ··· | ON |
| 0200AG99 | 00 (COMMON) | SKILL A | TECHNICAL | OPPOSITION ··· | OFF |

FIG.2D
130 QUESTIONNAIRE RESPONSE DATABASE

| EMPLOYEE NUMBER | QUESTION CODE | DUTY CODE | SKILL CODE | SKILL ELEMENT CODE | RESPONSE LEVEL VALUE |
|---|---|---|---|---|---|
| 123456 | 0102CK01 | 02 | SKILL C | EXPERIENCE | 2 (0~5) |
| 222222 | 0100AC99 | 00 (COMMON) | SKILL A | KNOWLEDGE | 5 (0~5) |

FIG.3A

140 TEST RESPONSE DATABASE

| EMPLOYEE NUMBER | QUESTION CODE | DUTY CODE | SKILL CODE | SKILL ELEMENT CODE | RESPONSE LEVEL VALUE |
|---|---|---|---|---|---|
| 123456 | 0202CC01 | 02 | SKILL C | KNOWLEDGE | 5 (CORRECT) |
| 222222 | 0200AG99 | 00 (COMMON) | SKILL A | TECHNICAL | 0 (WRONG) |

FIG.3B

SKILL/STANDARD MODEL COMPARISON DATABASE 150

151

| EMPLOYEE NUMBER | SKILL A EXPERIENCE TOTAL VALUE | SKILL A KNOWLEDGE TOTAL VALUE | ... | SKILL n CONSCIOUSNESS TOTAL VALUE |
|---|---|---|---|---|
| 123456 | 4 (0~5) | 4 (0~5) | ... | 1 (0~5) |

152

| TALENT IMAGE CODE | GRADE CODE | SKILL A EXPERIENCE COMPARATIVE DIFFERENCE | SKILL A KNOWLEDGE COMPARATIVE DIFFERENCE | ... | SKILL n CONSCIOUSNESS COMPARATIVE DIFFERENCE |
|---|---|---|---|---|---|
| J1 | G1 | -1 | 0 | ... | -3 |
| J2 | G2 | 0 | 0 | ... | 0 |
| ... | | | | | |
| JS | Gm | 0 | 0 | ... | 0 |

FIG.3C

STANDARD MODEL DATABASE 160

| TALENT IMAGE CODE | GRADE CODE | SKILL A EXPERIENCE STANDARD VALUE | SKILL A KNOWLEDGE STANDARD VALUE | ... | SKILL n CONSCIOUSNESS STANDARD VALUE |
|---|---|---|---|---|---|
| J1 | G1 | 5 | 4 | ... | 4 |
| J10 | G3 | 2 | 1 | ... | 3 |
| ... | | | | | |
| JS | Gm | 1 | 3 | ... | 1 |

FIG.4A

SKILL/TRAINING CORRESPONDENCE DATABASE 170

171
| TRAINING CODE |
|---|
| YYY01X |

172
| TALENT IMAGE CODE | GRADE CODE | SKILL A EXPERIENCE DESIRED VALUE | SKILL A KNOWLEDGE DESIRED VALUE | ... | SKILL n CONSCIOUSNESS DESIRED VALUE |
|---|---|---|---|---|---|
| J1 | G1 | 5 | 5 | ... | 5 |
| J1 | G2 | 5 | 3 | ... | 4 |
| J1 | G3 | 0 | 0 | ... | 0 |
| J1 | G4 | 0 | 0 | ... | 0 |
| JS | Gm | 0 | 0 | ... | 0 |

FIG.4B

TRAINING USE HISTORY DATABASE 180

| EMPLOYEE NUMBER | TRAINING CODE | DATE OF USE | RESULT OF USE |
|---|---|---|---|
| 123456 | YYY01Z | 19990201 | PASS |
| 222222 | YXW02A | 19971031 | FAILURE |

FIG.4C

TRAINING CONTENTS INFORMATION DATABASE 190

| TRAINING CODE | TRAINING NAME | SCHEDULE TO BE HELD | SITE CODE |
|---|---|---|---|
| YYY01Z | ○○DESIGN WORKSHOP | 2000080703 | 1301 |
| YXW02A | BASICS OF △△ | 2000090105 | 1503 |

FIG.5

TRAINING OFFER CONTROL DATABASE 200

201

| TRAINING CODE | OFFER FORM | COURSE | ACCEPTANCE OR REJECTION OF USE |
|---|---|---|---|
| YYY01Z | COURSE | | OK (THERE ARE SOME VACANT SEATS) |
| YXW07R | | PERSONAL COMPUTER COMMUNICATION GUIDANCE | NG (ALREADY OVERCAPACITY) |

202

| EMPLOYEE NUMBER TO BE OFFERED | RECOMMENDED TALENT IMAGE CODE | RECOMMENDED GRADE CODE |
|---|---|---|
| 123456 | $J_1$ | $G_2$ |
| 777777 | $J_1$ | $G_2$ |

203

| SKILL A EXPERIENCE TOTAL VALUE | RECOMMENDED DIFFERENCE VALUE | SKILL A KNOWLEDGE TOTAL VALUE | RECOMMENDED DIFFERENCE VALUE | ... | SKILL n CONSCIOUSNESS TOTAL VALUE | RECOMMENDED DIFFERENCE VALUE |
|---|---|---|---|---|---|---|
| 4 | -1 | 4 | -1 | ... | 1 | -4 |
| 4 | -1 | 3 | -2 | ... | 2 | -3 |

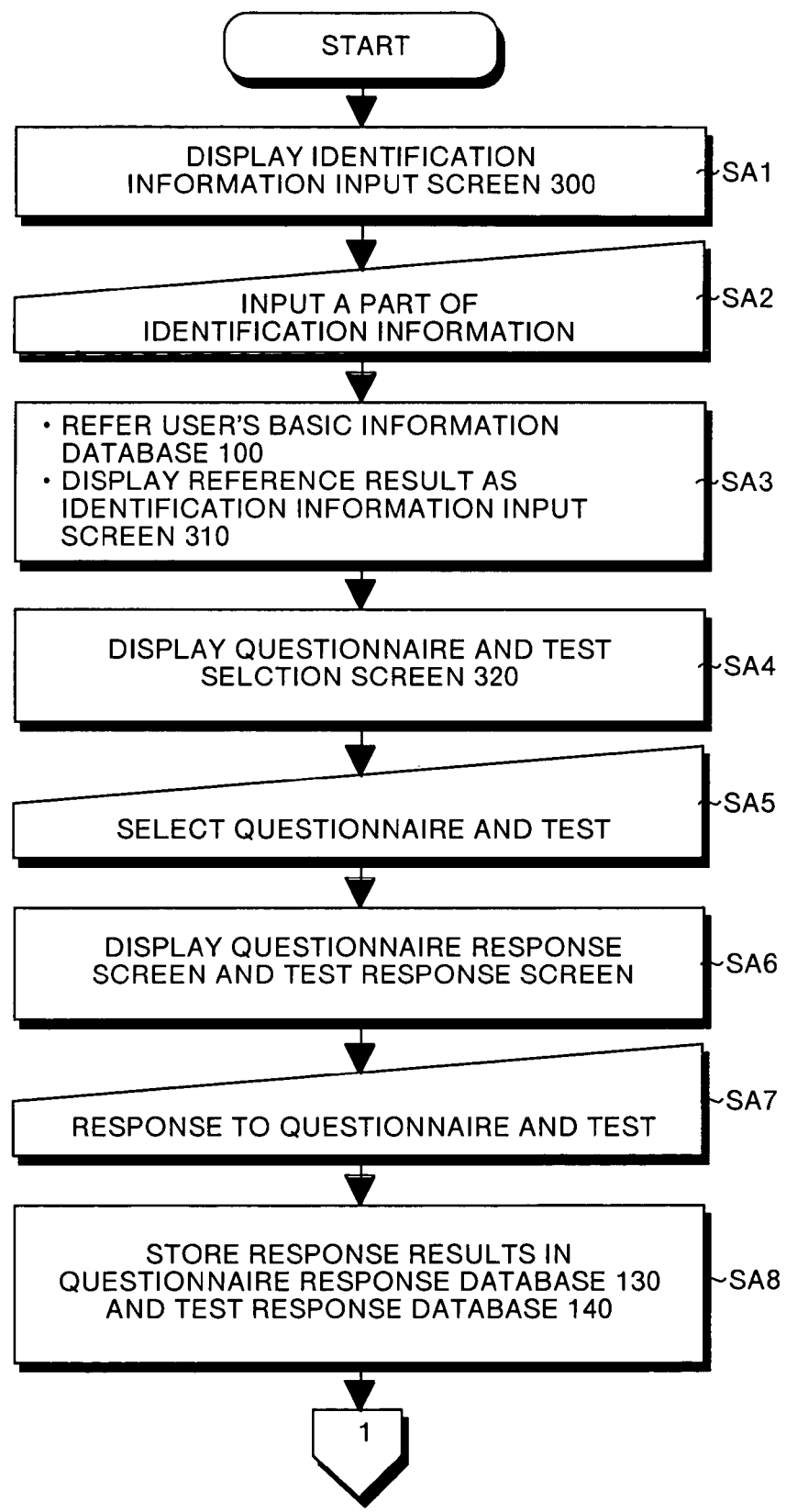

IDENTIFICATION INFORMATION INPUT SCREEN

SECTION CODE        1111
EMPLOYEE NUMBER     123456
PASSWORD            ＊＊＊＊
NAME
DUTY CODE           02   PLEASE SELECT ONE AMONG THE FOLLOWINGS.
                         01 : CONSULTING
                         02 : DEVELOPMENT
                         03 : PROJECT MANAGEMENT

IDENTIFICATION INFORMATION INPUT SCREEN

SECTION CODE        1111   TRAINING SECTION III
EMPLOYEE NUMBER     123456
PASSWORD
NAME                FUJITSU TARO
DUTY CODE           02   DEVELOPMENT
                         PLEASE GO TO SELECTION SCREEN
                         OF QUESTIONNAIRE AND TEST THAT
                         YOU WANT TO RESPOND.

QUESTIONNAIRE AND TEST SELECTION SCREEN

PLEASE TICK A BOX OF QUESTIONNAIRE AND TEST THAT YOU WILL RESPOND. SKILL RELATED TO THE DUTY IN CHARGE HAVE BEEN ALREADY TICKED. IF YOU DO NOT RESPOND DUE TO SUCH A REASON AS "ALREADY RESPONDED LATELY", PLEASE REMOVE THE TICK.

SKILL A (SKILL COMMON TO ALL DUTIES)
- ☐ QUESTIONNAIRE  LATEST RESPONSE DATE  2000.07.22
- ☐ TEST           LATEST RESPONSE DATE  2000.07.22

SKILL B (SKILL FOR A PERSON IN CHARGE OF CONSULTING)
- ☐ QUESTIONNAIRE  LATEST RESPONSE DATE  (NOT RESPONDED)
- ☐ TEST           LATEST RESPONSE DATE  (NOT RESPONDED)

SKILL C (SKILL FOR A PERSON IN CHARGE OF DEVELOPMENT)
- ■ QUESTIONNAIRE  LATEST RESPONSE DATE  2000.07.08
- ■ TEST           LATEST RESPONSE DATE  (NOT RESPONDED)

SKILL D (SKILL FOR A PERSON IN CHARGE OF PROJECT MANAGEMENT)
- ■ QUESTIONNAIRE  LATEST RESPONSE DATE  (NOT RESPONDED)
- ■ TEST           LATEST RESPONSE DATE  (NOT RESPONDED)

QUESTIONNAIRE RESPONSE SCREEN,
ENVIRONMENT FOR USING TRAINING

PLEASE TICK A RELEVANT BOX AMONG THE FOLLOWING
ENVIRONMENTS.

1. CAN YOU SPARE TIME FOR TRAINING EVERY DAY FOR ALMOST ABOUT 1 HOUR CONTINUOUSLY?
   - ☐ YES
   - ■ NO

2. DO YOU HAVE OWN PERSONAL COMPUTER TO USE FOR TRAINING?
   - ☐ YES
   - ■ NO

QUESTIONNAIRE RESPONSE SCREEN (SKILL C) (EXPERIENCE)

PLEASE TICK A BOX OF A LEVEL WHICH YOU HAVE PERFORMED AMONG THE FOLLOWING OPERATIONS.

1. STUDIED LEGAL RULES, ADMINISTRATIVE GUIDELINES, ETC. SUCH AS ELECTRICAL COMMUNICATION RULE.

- ☐ LEVEL 0  NO EXPERIENCE OF RELEVANT OPERATION
   - ☐ 1  PERFORMED OPERATION UNDER SPECIFIC INSTRUCTION
   - ■ 2  PERFORMED OPERATION UNDER INSTRUCTION OF ONLY MAIN POINT
   - ☐ 3  PERFORMED OPERATION AS MAIN PERSON IN CHARGE
   - ☐ 4  PERFORMED GUIDANCE OF RELEVANT OPERATION IN THE COMPANY
   - ☐ 5  PERFORMED GUIDANCE OF RELEVANT OPERATION OUTSIDE THE COMPANY

2. PERFORMED INVESTIGATION OF COMMUNICATION PROTOCOL, ETC.

- ☐ LEVEL 0  NO EXPERIENCE OF RELEVANT OPERATION
   - ■ 1  PERFORMED OPERATION UNDER SPECIFIC INSTRUCTION
   - ☐ 2  PERFORMED OPERATION UNDER INSTRUCTION OF ONLY MAIN POINT
   - ☐ 3  PERFORMED OPERATION AS MAIN PERSON IN CHARGE
   - ☐ 4  PERFORMED GUIDANCE OF RELEVANT OPERATION IN THE COMPANY
   - ☐ 5  PERFORMED GUIDANCE OF RELEVANT OPERATION OUTSIDE THE COMPANY

QUESTIONNAIRE RESPONSE SCREEN (SKILL C) (KNOWLEDGE)

PLEASE TICK A BOX OF A RELEVANT LEVEL,
AMONG THE FOLLOWING KNOWLEDGE.

1. ABOUT TRANSMISSION MEDIA OF LAN
   - ☐ LEVEL 0   NO KNOWLEDGE
   - ☐ 1 KNOWS A TERM "TRANSMISSION MEDIA"
   - ☐ 2 KNOWS ROUGH TYPES OF TRANSMISSION MEDIA
   - ☐ 3 KNOWS STRUCTURE OF EACH TYPE OF TRANSMISSION MEDIA
   - ■ 4 KNOWS ADVANTAGES AND DISADVANTAGES OF EACH TYPE OF TRANSMISSION MEDIA
   - ☐ 5 KNOWS TYPICAL APPLICATION CASE OF EACH TYPE OF TRANSMISSION MEDIA

2. ABOUT ACCESS METHOD OF LAN
   - ☐ LEVEL 0   NO KNOWLEDGE
   - ☐ 1 KNOWS A TERM "ACCESS METHOD"
   - ☐ 2 KNOWS ROUGH TYPES OF ACCESS METHODS
   - ☐ 3 KNOWS PRINCIPLE OF EACH TYPE OF ACCESS METHODS
   - ☐ 4 KNOWS ADVANTAGES AND DISADVANTAGES OF EACH TYPE OF ACCESS METHODS
   - ■ 5 KNOWS TYPICAL APPLICATION CASE OF EACH TYPE OF ACCESS METHODS

TEST RESPONSE SCREEN, SKILL C (KNOWLEDGE)

QUESTION 1. PLEASE TICK A BOX OF A CORRECT SENTENCE AMONG THE FOLLOWING DESCRIPTIONS.

- ■ SMTP IS A PROTOCOL FOR TRANSMITTING AN ELECTRONIC MAIL.
- ☐ TCP IS AN UPPER LEVEL THAN SMTP.
- ☐ THE ACCESS METHOD USED IN FDDI IS CSMA/CD METHOD.

. . .

QUESTION 2. PLEASE TICK A BOX OF A WRONG SENTENCE AMONG THE FOLLOWING DESCRIPTIONS.

- ☐ UDP IS AN UPPER LEVEL THAN IP.
- ☐ UDP IS A PROTOCOL IN THE TRANSPORT LAYER.
- ■ THE CHARACTERISTIC OF UDP IS AN ERROR RETRANSMISSION CONTROL.

. . .

QUESTION 3. . . .

TEST RESPONSE SCREEN, SKILL C (TECHNICAL)

QUESTION 1.  PLEASE TICK A BOX SHOWING THE MOST PROPER MEASURE IN THE CASE OF THE FOLLOWING FAILURES. "COMMUNICATION WITHIN THE SAME SEGMENT IS POSSIBLE WITH TCP/IP, BUT COMMUNICATION VIA IP ROUTER IS NOT POSSIBLE."

☐ TO CONFIRM WHETHER SETTING OF A SUBNET MASK OF THE TERMINAL IS CORRECT OR NOT.

☐ TO CONFIRM WHETHER THERE IS A TERMINAL HAVING AN OVERLAPPING MAC ADDRESS OR NOT.

TEST RESPONSE SCREEN, SKILL D (CONSCIOUSNESS)

QUESTION 1. PLEASE TICK A BOX SHOWING THE MOST PROPER MEASURE IN ORDER TO IMPROVE THE TEAMWORK.

☐ IF THERE IS HETEROGENEOUS IDEA IN THE PROJECT, EXCLUDE IT AT AN EARLIER STAGE.

☐ IF THERE IS PRIVATE HUMAN RELATION AMONG MEMBERS, NEGLECT IT.

RECOMMENDED TRAINING GUIDANCE SCREEN

TO TARO FUJITSU, TRAINING SECTION III

THE OPTIMUM TRAINING IN VIEW OF YOUR CURRENT SKILL IS AS DESCRIBED BELOW.

TRAINING NAME: "XX DESIGN WORKSHOP"
SCHEDULE TO BE HELD: XX.XX.~XX
TRAINING SITE: TOKYO XX BLDG., X-TH FLOOR, TRAINING ROOM

RECOMMENDED EFFECTIVENESS EVALUATION SCREEN

TO TARO FUJITSU, TRAINING SECTION III

PLEASE EVALUATE THE EFFECTIVENESS OF THE RECOMMENDED TRAINING.
TRAINING NAME: "XX DESIGN WORKSHOP"
THE DEGREE OF THE TRAINING WITH REGARD TO SKILL C IS:

| | | | |
|---|---|---|---|
| IN THE ASPECT OF EXPERIENCE, THE CONTENT OF TRAINING WAS | ☐ TOO HIGH | ■ ADEQUATE | ☐ TOO LOW |
| IN THE ASPECT OF KNOWLEDGE, THE CONTENT OF TRAINING WAS | ☐ TOO HIGH | ☐ ADEQUATE | ■ TOO LOW |
| IN THE ASPECT OF TECHNICAL SKILL, THE CONTENT OF TRAINING WAS | ☐ TOO HIGH | ■ ADEQUATE | ☐ TOO LOW |
| IN THE ASPECT OF CONSCIOUSNESS, THE CONTENT OF TRAINING WAS | ■ TOO HIGH | ☐ ADEQUATE | ☐ TOO LOW |

THANK YOU FOR YOUR RESPONSE.

RELEVANT FIELD RECOMMENDED TRAINING GUIDANCE SCREEN

TO TARO FUJITSU, TRAINING SECTION III

THE OPTIMUM TRAINING IN VIEW OF YOUR
CURRENT SKILL IS AS DESCRIBED BELOW:
    TRAINING NAME:        "XX DESIGN WORKSHOP"
    SCHEDULE TO BE HELD: XX.XX.~XX
    TRAINING SITE:         TOKYO XX BLDG., X-TH FLOOR, TRAINING ROOM

OPTIMUM TRAINING IN THE RELEVANT FIELD IS AS FOLLOWS:

TRAINING NAME:        "XX BUILD-UP WORKSHOP"
    SCHEDULE TO BE HELD: XX.XX.~XX
    TRAINING SITE:         CHIBA XX CENTER, X-TH FLOOR, EXERCISE ROOM

CHALLENGING RECOMMENDED TRAINING GUIDANCE SCREEN

TO TARO FUJITSU, TRAINING SECTION III

THE OPTIMUM TRAINING IN VIEW OF YOUR
CURRENT SKILL IS AS DESCRIBED BELOW:

TRAINING NAME:        "XX DESIGN WORKSHOP"
    SCHEDULE TO BE HELD: XX.XX.~XX
    TRAINING SITE:          TOKYO XX BLDG., X-TH FLOOR, TRAINING ROOM

IF YOU AIM AT INSTANT SKILL UP, THE OPTIMUM TRAINING IS AS FOLLOWS:

TRAINING NAME:        "XX DESIGN TRIATHLON BY LODGING TOGETHER"
    SCHEDULE TO BE HELD: XX.XX.~XX
    TRAINING SITE:          ODAWARA XX TRAINING INSTITUTE

METHOD AND APPARATUS FOR RECOMMENDING AN OPTIMUM TRAINING TO A TRAINEE, AND A COMPUTER PRODUCT

FIELD OF THE INVENTION

The present invention relates to a technology for recommending an optimum training to a trainee depending upon the skill of the trainee. This technology may be used in training departments of companies or the training service organizations.

BACKGROUND OF THE INVENTION

In companies, various training systems are established to improve skill necessary for accomplishing business, such as management, technology and bargaining skills. Heretofore, however, when selection of trainings relies on the subjectivity of a trainee, there is such a problem that the outcome (effectiveness) of the training decreases in proportion to the difference between subjective skill and objective skill, and means and methods that can effectively solve such a problem have been desired.

In industries, various trainings have been heretofore performed as apart of skill up of employees. Here, a trainee receives training that is considered to be subjectively most suitable from a plurality of trainings, based on ambiguous self recognition of own skill or advertising equation of the training.

In particular, in companies positively tackling with raising of brilliant talented persons, training is looked upon as important, and a large sum of budget is allocated to the training. Accordingly, in such companies, a variety of training programs corresponding to various occupational categories are prepared for employees.

As described above, skill up of trainees is expected through various training. In order to increase the outcome of training, it is necessary for trainees to receive training of the optimum level and contents, corresponding to the objective current skill of the trainee.

However, in general, trainees choose training which is considered to be the most suitable from among a plurality of trainings, based on ambiguous and subjective self recognition of own skill or advertising equation of the training. In this case, there is a problem in that as the difference between subjective skill and objective skill increases, the outcome of the training cannot be expected.

Here, there can be considered a method in which the objective skill of the trainee is grasped by the third party such as a training adviser or the like to recommend the most suitable training. However, considering such situations that the trend of trainee's skill continues to change rapidly, and that training contents are diversified, such a method requires a huge amount of time and labor, and in particular, if there are a large number of trainees, it is not practical.

SUMMARY OF THE INVENTION

It is an object of the present invention to provide a method and apparatus for recommending an optimum training to a trainee and thereby improve the outcome of the training. It is another object of this invention to provide a computer readable recording medium that stores a computer program which when executed realizes the method according to the present invention.

The apparatus for recommending an optimum training according to one aspect of this invention comprises a standard skill trend information database which stores standard skill trend information corresponding to a standard talent image; a training information database which stores training information corresponding to the standard skill trend information; a skill trend information collection unit which collects skill trend information of a trainee in a question and answer format, via on-line; an analyzing unit which objectively analyzes the skill trend and talent image of the trainee, based on the comparison result of the standard skill trend information and the skill trend information; and a selection unit which selects training information that suits to the trainee from the training information database as the optimum training recommendation information, based on the result of analysis by the analyzing unit.

The method for recommending an optimum training according to another aspect of this invention comprises a first storing step of storing standard skill trend information corresponding to a standard talent image in standard skill trend information database; a second storing step of storing training information corresponding to the standard skill trend information in training information database; a skill trend information collecting step of collecting skill trend information of a trainee in a question and answer format, via on-line; an analyzing step of objectively analyzing the skill trend and talent image of the trainee, based on the comparison result of the standard skill trend information and the skill trend information; and a selection step of selecting training information that suits to the trainee from the training information database as the optimum training recommendation information, based on the result of analysis by the analyzing step.

The computer readable recording medium according to still another aspect of the present invention stores a computer program which when executed realizes the method according to the present invention.

According to the above-mentioned aspects of this invention, the skill trend information of a trainee is collected, to objectively analyze the skill trend and talent image of the trainee, based on the comparison result of the standard skill trend information and the skill trend information, and the training information that suits to the trainee is selected as the optimum training recommendation information, based on the analysis result. As a result, the optimum training can be recommended to the trainee, and the outcome of the training can be improved.

Other objects and features of this invention will become apparent from the following description with reference to the accompanying drawings.

BRIEF DESCRIPTION OF THE DRAWINGS

FIG. 1 is a block diagram showing a construction of one embodiment of the present invention.

FIG. 2A shows a structure of the user's basic information database 100,

FIG. 2B shows a structure of the questionnaire database 110,

FIG. 2C shows a structure of the test question database 120, and

FIG. 2D shows a structure of the questionnaire response database 130, all shown in FIG. 1.

FIG. 3A shows a structure of the test response database 140,

FIG. 3B shows a structure of the skill/standard model comparison database 150, and FIG. 3C shows a structure of the standard model database 160, all shown in FIG. 1.

FIG. 4A shows a structure of the skill/training correspondence database 170,

FIG. 4B shows a structure of the training use history database 180, and

FIG. 4C shows a structure of the training contents information database 190, all shown in FIG. 1.

FIG. 5 is a diagram showing a table structure of training offer control database 200 shown in FIG. 1.

FIG. 6 is a flowchart for explaining the operation in one embodiment.

FIG. 12 is a diagram showing one example of an identification information input screen 300 in one embodiment.

FIG. 13 is a diagram showing one example of an identification information input screen 310 in one embodiment.

FIG. 14 is a diagram showing one example of a questionnaire and test selection screen 320 in one embodiment.

FIG. 15 is a diagram showing one example of a questionnaire response screen 325 in one embodiment.

FIG. 17 is a diagram showing one example of a questionnaire response screen 330 shown in FIG. 16.

FIG. 18 is a diagram showing one example of a questionnaire response screen 340 shown in FIG. 16.

FIG. 19 is a diagram showing one example of a test response screen 380 shown in FIG. 16.

FIG. 20 is a diagram showing one example of a test response screen 390 shown in FIG. 16.

FIG. 22 is a diagram showing one example of a test response screen 480 shown in FIG. 21.

FIG. 23 is a diagram showing one example of a recommended training guidance screen 490 in one embodiment.

FIG. 24 is a diagram showing one example of a recommended effectiveness evaluation screen 500 in one embodiment.

FIG. 25 is a diagram showing one example of a relevant field recommended training guidance screen 520 in one embodiment.

FIG. 26 is a diagram showing one example of a challenging recommended training guidance screen 510 in one embodiment.

DESCRIPTION OF THE PREFERRED EMBODIMENTS

Figure 7A:
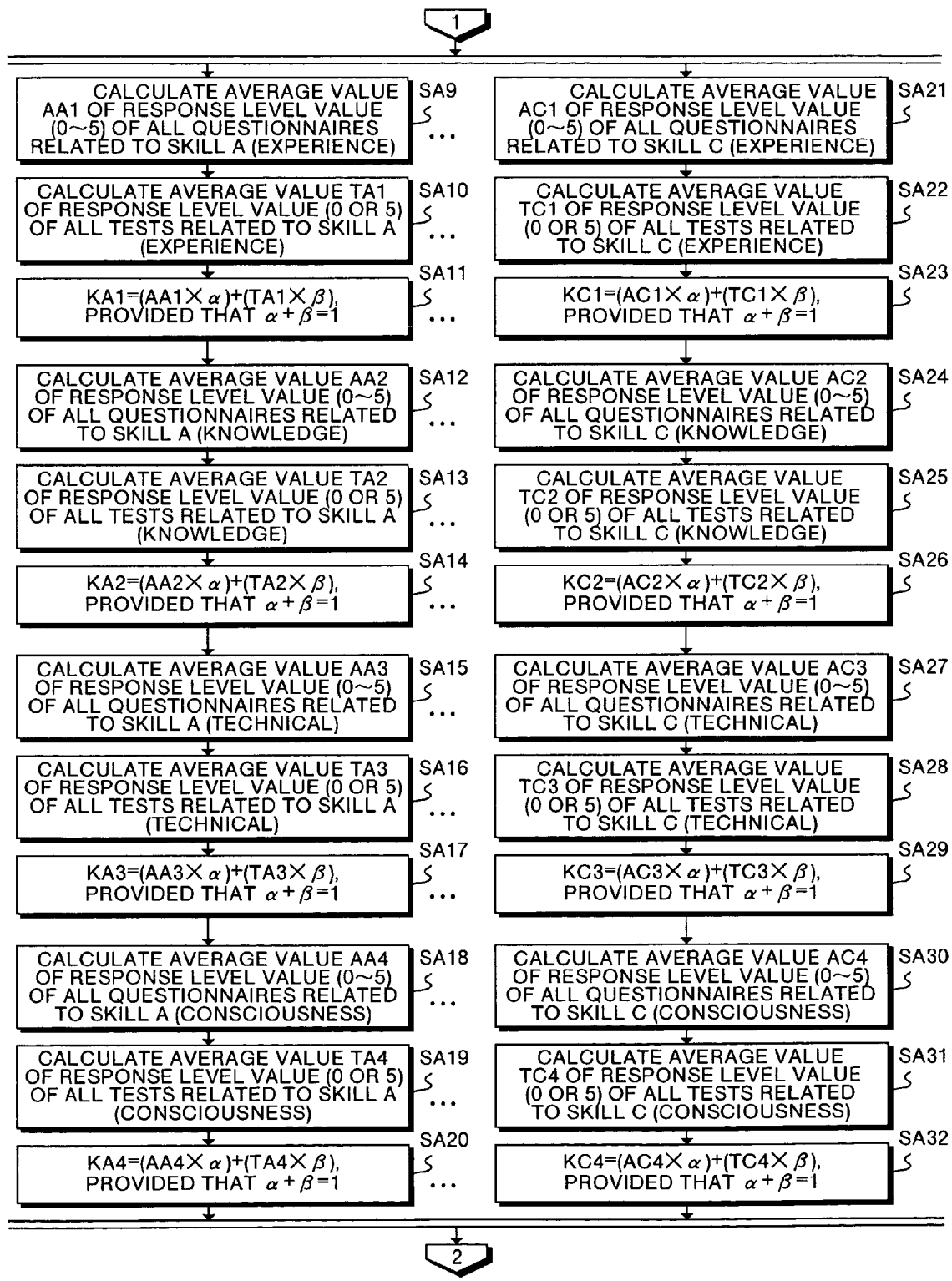
FIG. 7A and FIG. 7B show a flowchart for explaining the operation in one embodiment.

A preferred embodiment of the method and apparatus for recommending an optimum training according to this invention will now be described in detail.

FIG. 1 is a block diagram showing a construction of one embodiment of the present invention. In this figure, there is shown a client/server type optimum training recommendation system for objectively judging the skill of a trainee and recommending an optimum training corresponding to the skill. In FIG. 1, for the sake of simplicity, communication apparatus (terminal adapter, router, fire wall or the like) necessary for Internet connection is not shown. Below is a description of one example where an optimum training is recommended to employees (trainees) in industry.

Each of clients $10_1$ to $10_n$ shown in this figure is a computer terminal operated by a trainee, for accessing a server 30 via a network 20. These clients $10_1$ to $10_n$ comprise a computer body, a display, a keyboard, a mouse and the like, and has a function of accessing various screens provided by the server 30 described below by means of browser (not shown). Here, the network 20 is Internet or Intranet.

The server 30 is an optimum training recommendation apparatus for judging the skill of a trainee objectively and recommending an optimum training corresponding to the skill based on various data. In the server 30, an identification section 31 has a function of identifying the concerned individual (trainee), based on the information input by the trainee (section code, employee number, password) and the user's basic information database 100.

The user's basic information database 100 is database which stores user's basic information related to the user (trainee) of the server 30. Specifically, as shown in FIG. 2A, the user's basic information database 100 comprises fields of "section code", "section name", "employee number", "name", "password", "duty code", "skill A questionnaire—latest response date", "skill n test—latest response date", . . . and "skill n test—latest response date".

"Section code" is the information related to a code for identifying the section to which the trainee belongs. "Section name" is the information related to the name of the section to which the trainee belongs. "Employee number" is the information related to the employee number given to the trainee (employee). "Name" is the information related to the name of the trainee. "Password" is the information related to a password of the trainee for authentication, when the trainee accesses the server 30.

"Duty code" is a code for identifying the duty of which the trainee is in charge. "Skill A questionnaire—latest response date" is the information related to the latest response date of the questionnaire described below, corresponding to skill A. "Skill A test—latest response date" is the information related to the latest response date of the test described below, corresponding to skill A. "Skill n test—latest response date" is the information related to the latest response date of the test described below, corresponding to skill n.

Here, "talent image", "grade" and "skill" used in one embodiment will be described. For example, among talent models referred to as "SE", "CE" or the like, there are some roles as described below.

| Talent Image | Role |
|---|---|
| Consultant | To grasp needs of customers and propose a system plan from a viewpoint of management |
| Project manager | To control progress of a project, product, member or the like, in order to maintain delivery date, quality and cost of the system |

-continued

| Talent Image | Role |
| --- | --- |
| Application authority | To study how to realize an efficient system, by combining the business such as "human affairs" and "accounting" that the customer actually performs with what kind of programs, screen, database or the like |
| Technical authority | To solve technical problems such as securement of security of the system, speed up of data processing or the like |

Therefore, in industry, there are talent images such as a consultant and a project manager, who require interpersonal correspondence type skill for interview, contract or the like, rather than information technical type skill such as programming language and network equipment, and talent images such as application authority and technical authority, who require information technical skill rather than the interpersonal correspondence type skill.

Here, the above-described talent images are comprehended step-by-step, to introduce a concept of lower grade, middle grade and higher grade, and subdivide skill into skill elements of "knowledge", "technical skill", "consciousness" and "experience". Below is a description of one example of relationship of skill, middle grade of project manager (talent image), middle grade of technical authority (talent image) and required skill level (expressed by 0 to 5). Skill A to skill n shown in FIG. 2A corresponds to skill described below.

<Talent Image and Grade>

| Skill | Skill element | Project manager Middle grade | Technical authority Middle grade |
| --- | --- | --- | --- |
| Negotiation with customer | Knowledge | Level 3 | Level 2 |
| | Technical skill | Level 3 | Level 1–2 |
| | Consciousness | Level 4 | Level 2–3 |
| | Experience | Level 2–3 | Level 1–2 |
| Contract with customer | Knowledge | Level 4 | Level 1 |
| | Technical skill | Level 3 | Level 1 |
| | Consciousnes | Level 4 | Level 1–2 |
| | Experience | Level 2–3 | Level 1 |
| Network designing | Knowledge | Level 1 | Level 4 |
| | Technical skill | pretermission | Level 3–4 |
| | Consciousness | Level 1 | Level 4 |
| | Experience | pretermission | Level 3–4 |
| Cost management | Knowledge | Level 4 | Level 2 |
| | Technical skill | Level 3–4 | Level 2 |
| | Consciousnes | Level 4 | Level 2 |
| | Experience | Level 3–4 | Level 1 |

Returning to FIG. 1, a questionnaire selection section 32 has a function of asking a trainee to select the relevant one from questionnaire for each skill in order to objectively analyze the skill of the trainee (see FIG. 14). A questionnaire formulating section 33 has a function of formulating and outputting the above questionnaire via a Web page, based on the selection result in the questionnaire selection section 32 and the questionnaire database 110.

The questionnaire database 110 is database which stores the information related to the above questionnaire in the selection-response format. Specifically, as shown in FIG. 2B, the questionnaire database 110 comprises fields of "question code", "duty code", "skill code", "skill element code" and "text". "Question code" is a code for identifying the questionnaire.

"Duty code" is a code corresponding to the duty. "Skill code" is a code for identifying skill A to n. "Skill element code" is a code for identifying "knowledge", "technical skill", "consciousness" and "experience". "Text" is text information related to the questionnaire.

Returning to FIG. 1, a test selection section 34 has a function for asking a trainee to select the relevant one from tests for each skill in order to objectively analyze the skill of the trainee (see FIG. 14). A test formulating section 35 has a function of formulating and outputting the above test via a Web page, based on the selection result in the test selection section 34 and the test question database 120.

The test question database 120 is database which stores the information related to the above questions in the selection-response format. Specifically, as shown in FIG. 2C, the test question database 120 comprises fields of "question code", "duty code", "skill code", "skill element code", "text" and "correct answer flag".

"Question code" is a code for identifying the test questions. "Duty code" is a code for identifying the duty corresponding to the relevant test question. "Skill code" is a code for identifying skill A ton. "Skill element code" is a code for identifying "knowledge", "technical skill", "consciousness" and "experience". "Text" is text information related to the test questions and answer candidates of the test. "Correct answer flag" is a flag representing whether the concerned selection is correct or not (ON=correct, OFF=not correct), when the answer candidate is selected.

Returning to FIG. 1, a questionnaire response section 36 has a function for asking the trainee to answer the above-described questionnaire via the Web page and storing the response result in questionnaire response database 130. The questionnaire response database 130 is database which stores the response result of the questionnaire corresponding to the trainee.

Specifically, as shown in FIG. 2D, the questionnaire response database 130 comprises fields of "employee number", "question code", "duty code", "skill code", "skill element code" and "response level value". "Employee number" corresponds to the "employee number" of user's basic information database 100 (see FIG. 2A).

"Question code", "duty code", "skill code" and "skill element code" correspond to "question code", "duty code", "skill code" and "skill element code" of the questionnaire database 110 (see FIG. 2B). "Response level value" is information representing what was selected in the questionnaire of selection-response format.

Returning to FIG. 1, a test response section 37 has a function for asking the trainee to respond the above-described test via the Web page and storing the response result in test response database 140. The test response database 140 is database which stores the response result of the test corresponding to the trainee.

Specifically, as shown in FIG. 3A, the test response database 140 comprises fields of "employee number", "question code", "duty code", "skill code", "skill element code" and "response level value". "Employee number" corresponds to the "employee number" of user's basic information database 100 (see FIG. 2A).

"Question code", "duty code", "skill code" and "skill element code" correspond to "question code", "duty code", "skill code" and "skill element code" of the test question database 120 (see FIG. 2C). "Response level value" is information representing correct or wrong answer (5=correct answer, 0=wrong answer).

Returning to FIG. 1, a skill analysis section 38 has a function for objectively analyzing the skill of the trainee, based on the questionnaire response database 130, test response database 140, skill/standard model comparison database 150 and standard model database 160. The operation of this skill analysis section 38 will be described later in detail. The standard model database 160 is database which stores the information of standard skill in the talent image (standard model) of the above-described grade (hereinafter referred to as standard skill).

Specifically, as shown in FIG. 3C, the standard model database 160 comprises fields of "talent image code", "grade code", "skill A experience standard value", "skill A knowledge standard value", "skill n consciousness standard value".

"Talent image code" is a code for identifying the above-described talent image (consultant, project manager, or the like). "Grade code" is a code for identifying the grade (lower, middle, upper or the like) of the above-described talent image. "Skill A experience standard value" is the information representing the standard value (expressed by 0 to 5) in the "experience" of skill A required for the talent image of the relevant grade.

"Skill A knowledge standard value" is the information representing the standard value in the "knowledge" of skill A required for the talent image of the relevant grade. Similarly, "skill n consciousness standard value" is the information representing the standard value in the "consciousness" of skill n required for the talent image having skill n of the relevant grade.

The skill/standard model comparison database 150 shown in FIG. 3B comprises a skill total value table 151 which stores the skill total value of the trainee who responded to the questionnaire and the test, and a skill comparative difference table 152 which stores a result of comparison of the above-described standard model database 160 and the skill total value of the trainee. Specifically, the skill total value table 151 comprises fields of "employee number", "skill A experience total value", "skill A knowledge total value", "skill n consciousness total value". Moreover, the skill comparative difference table 152 comprises fields of "talent image code", "grade code", "skill A experience comparative difference", "skill A knowledge comparative difference", "skill n consciousness comparative difference".

The "employee number" corresponds to the "employee number" of questionnaire response database 130 (see FIG. 2D) and test response database 140 (see FIG. 3A). "Skill A experience total value" is the information representing the skill A (experience) related to the concerned trainee in an objective level numerical value (0 to 5), based on the response of the questionnaire and the test. "Skill A knowledge total value" is the information representing the skill A (knowledge) related to the concerned trainee in an objective level numerical value (0 to 5), based on the response of the questionnaire and the test.

Similarly, "Skill n consciousness total value" is the information representing the skill n (consciousness) related to the concerned trainee in an objective level numerical value (0 to 5), based on the response of the questionnaire and the test. "Talent image code" and "grade code" respectively correspond to "talent image code" and "grade code" of the standard model database 160 (see FIG. 3C).

"Skill A experience comparative difference" is the information representing the comparative difference between the above-described "skill A experience total value" and the "skill A experience standard value" of the standard model database 160. "Skill A knowledge comparative difference" is the information representing the comparative difference between the above-described "skill A knowledge total value" and the "skill A knowledge standard value" of the standard model database 160. Similarly, "skill n consciousness comparative difference" is the information representing the comparative difference between the above-described "skill n consciousness total value" and the "skill n consciousness standard value" of the standard model database 160.

Returning to FIG. 1, a training selection section 39 has a function of selecting (recommending) the optimum training for the concerned trainee, based on the skill analysis result of the skill analysis section 38 (see skill/standard model comparison database 150), the skill/training correspondence database 170, the training use history database 180 and the training offer control database 200. The skill/training correspondence database 170 is the database which stores the information representing the correspondence of the skill for each grade/talent image described above and the training.

Specifically, as shown in FIG. 4A, the skill/training correspondence database 170 comprises a training code table 171 and a skill table 172. The training code table 171 comprises a field of "training code". This "training code" is a code for identifying training. The skill table 172 is provided corresponding to the training code, and comprises fields of "talent image code", "grade code", "skill A experience desired value", "skill A knowledge desired value", "skill n consciousness desired value".

"Talent image code" and "grade code" respectively correspond to "talent image code" and "grade code" of the skill/standard model comparison database 150 (see FIG. 3B). "Skill A experience desired value" is the information representing the desired value for acquiring skill A (experience) suitable for taking the training, in a level numerical value (0 to 5). "Skill A knowledge desired value" is the information representing the desired value for acquiring skill A (knowledge) suitable for taking the training, in a level numerical value (0 to 5). Similarly, "skill n consciousness desired value" is the information representing the desired value for acquiring skill n (consciousness) suitable for taking the training, in a level numerical value (0 to 5).

The training use history database 180 shown in FIG. 4B is database which stores the training use history information related to the training which was used by the trainee in the past, and comprises fields of "employee number", "training code", "date of use" and "result of use". "Employee number" corresponds to the "employee number" of user's basic information database 100 (see FIG. 2A) "Training code" corresponds to the "training code" of the training code table 171. "Date of use" is the information related to the date when the trainee used the relevant training. "Result of use" is the information related to the outcome of the training by the trainee (pass or failure).

Returning to FIG. 1, a recommended training guidance section 40 performs specific guidance of the training selected by the training selection section 39 with respect to the trainee, based on the training contents information database 190. The training contents information database 190 is the database which stores the training contents information. Specifically, as shown in FIG. 4C, the training contents information database 190 comprises fields of "training code", "training name", "schedule to be held", and "site code".

"Training code" corresponds to the "training code" of the skill/training correspondence database 170 (see FIG. 4A), and "training name" is the information related to the training name. "Schedule to be held" is the information related to the schedule when the training is held, and "site code" is a code for identifying the site where the training is held. Returning to FIG. 1, a recommended effectiveness evaluation section 41 has a function of evaluating the effectiveness (outcome) of the recommended training.

The training offer control database 200 shown in FIG. 5 is the database which stores the information for controlling the training offered to the trainee. Specifically, the training offer control database 200 comprises fields of "training code", "offer form", "acceptance or rejection of use", "employee number to be offered", "recommended talent image code", "recommended grade code", "skill A experience total value", "recommended difference value", "skill A knowledge total value", "recommended difference value", "skill n consciousness total value" and "recommended difference value".

"Training code" is a code for identifying the training offered to the trainee. "Offer form" is the information representing the training form offered to the trainee. "Acceptance or rejection of use" is the information representing whether the use of the training should be accepted or not (OK=there is a vacant seat, NG=already over capacity). "Employee number to be offered" is the information for identifying the trainee (employee) to whom the training is offered. "Recommended talent image code" is a code for identifying a talent image corresponding to the trainee to whom the relevant training is recommended. "Recommended grade code" is a code for identifying the grade corresponding to the concerned trainee.

"Skill A experience total value" corresponds to "skill A experience total value" in the skill/standard model comparison database 150 (see FIG. 3B). "Recommended difference value" is the information representing the difference between the above-described "skill A experience total value" and the "skill A experience desired value" in the skill table 172 (see FIG. 4A). "Skill A knowledge total value" corresponds to "skill A knowledge total value" in the skill/standard model comparison database 150 (see FIG. 3B). "Recommended difference value" is the information representing the difference between the above-described "skill A knowledge total value" and the "skill A knowledge desired value" in the skill table 172 (see FIG. 4A).

Similarly, "skill n consciousness total value" corresponds to the "skill n consciousness total value" in the skill/standard model comparison database 150 (see FIG. 3B), and "recommended difference value" is the information representing the difference between the above-described "skill n consciousness total value" and the "skill n consciousness desired value" in the skill table 172 (see FIG. 4A).

Next, the operation of the embodiment described above will be described with reference to FIG. 6 to FIG. 26. FIG. 6 to FIG. 11 are flowcharts for explaining the operation of the embodiment and FIG. 12 to FIG. 26 are views showing various screens provided from the server 30 to clients $10_1$ to $10_{10}$ and browser displayed on respective displays of clients $10_1$ to $10_{10}$. Hereinafter, a description is given of a case where a trainee operates a client $10_1$ to access the server 30, and the training most suitable to the trainee is recommended by the server 30.

When the clients $10_1$ shown in FIG. 1 accesses the server 30 via a network 20, in step SA1 shown in FIG. 6, the identification section 31 displays the identification information input screen 300 on a display of the client $10_1$ shown in FIG. 12. This identification information input screen 300 is a screen for inputting the identification information or the like of the trainee, and input fields such as "section code", "employee number", "password" and the like are displayed.

In step SA2, the trainee operates the keyboard of the client $10_1$ to input "section code", "employee number" and "password" respectively, as a part of identification information on the identification information input screen 300. As a result, in step SA3, the identification section 31 refers the user's basic information database 100 (see FIG. 2A), using a part of the input private information as a key, and as shown in FIG. 13, to thereby display remaining identification information corresponding to the trainee on the identification information input screen 310.

In step SA4, the questionnaire selection section 32 and the test selection section 34 obtain the information related to "skill A questionnaire—latest response date", "skill A test—latest response date", . . . corresponding to the trainee from the user's basic information database 100 (see FIG. 2A), and to thereby display the questionnaire and test selection screen 320 shown in FIG. 14 on the display of the client $10_1$, based on these information. This questionnaire and test selection screen 320 is a screen for asking the trainee to select a questionnaire and a test for each skill to be answered.

In step SA5, the trainee operates the mouse of the client $10_1$ to tick in the check box for selection on the questionnaire and test selection screen 320, to thereby select the questionnaire and test corresponding to the own skill.

As a result, the questionnaire formulating section 33 obtains the questionnaire information for setting questions from the questionnaire database 110 (see FIG. 2B), using the selected skill in the questionnaire as a key. Similarly, the test formulating section 35 obtains the test question information for setting questions from the test question database 120 (see FIG. 2C), using the selected skill in the test as a key. These questionnaire information and the test question information are delivered to the questionnaire response section 36 and the test response section 37 by the questionnaire selection section 32 and the test selection section 34.

In step SA6, the questionnaire response section 36 and the test response section 37 cause the questionnaire response screen and the test response screen corresponding to the skill selected in step SA5 to be displayed sequentially. In step SA7, the trainee operates the mouse of the client $10_1$ to thereby respond to the questionnaire and the test, respectively.

Figure 16:
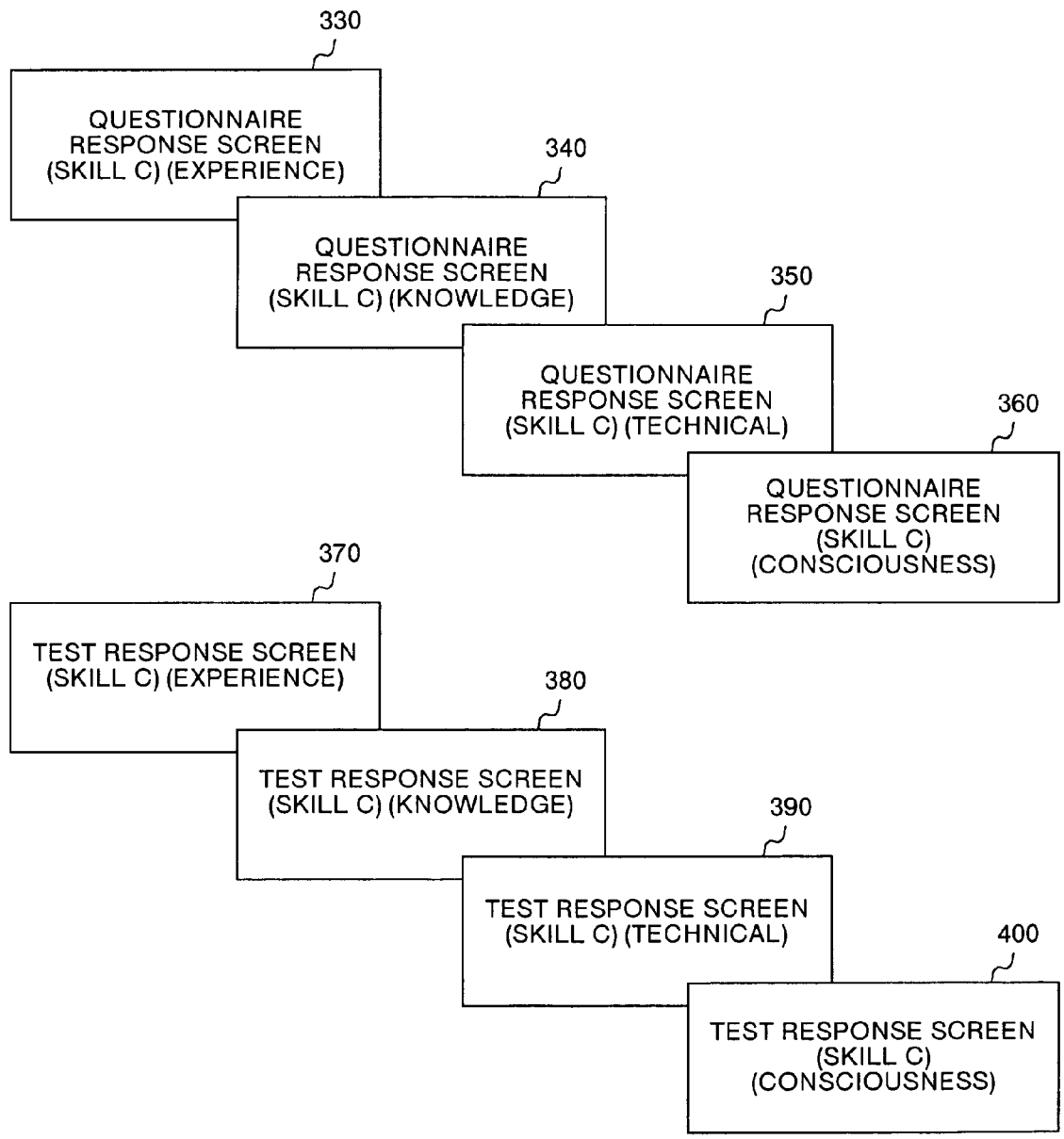
FIG. 16 is a diagram showing transition of a questionnaire response screen and a test response screen in one embodiment.

In an example shown in FIG. 16, the questionnaire response screens 330, 340, 350 and 360 corresponding to the skill C (experience, knowledge, technical skill, consciousness) are sequentially displayed. The questionnaires in these questionnaire response screens 330 and the like correspond to the above-described questionnaire information.

Here, one example of the questionnaire response screen 330 and the questionnaire response screen 340 are shown in FIG. 17 and FIG. 18, respectively. The questionnaire response screen 330 shown in FIG. 17 is a screen where a questionnaire for objectively analyzing the skill C (experience) of the trainee is displayed. The questionnaire response screen 340 shown in FIG. 18 is a screen where a questionnaire for objectively analyzing the skill C (knowledge) of the trainee is displayed. The trainee responds in a selection format to the respective questionnaires on the above-described questionnaire response screens 330, 340, 350 and 360.

Moreover, in the example shown in FIG. 16, test response screens 370, 380, 390 and 400 corresponding to the skill C (experience, knowledge, technical skill, consciousness) are sequentially displayed. The test questions in these test response screens 370 and the like correspond to the above-described test question information.

Here, one example of the test response screen 380 and the test response screen 390 are shown in FIG. 19 and FIG. 20, respectively. The test response screen 380 shown in FIG. 19 is a screen where test questions for objectively analyzing the skill C (knowledge) of the trainee are displayed. The test response screen 390 shown in FIG. 20 is a screen where test questions for objectively analyzing the skill C (technical skill) of the trainee are displayed. The trainee responds in a selection format to the respective test questions on the above-described test response screens 370, 380, 390 and 400.

Figure 21:
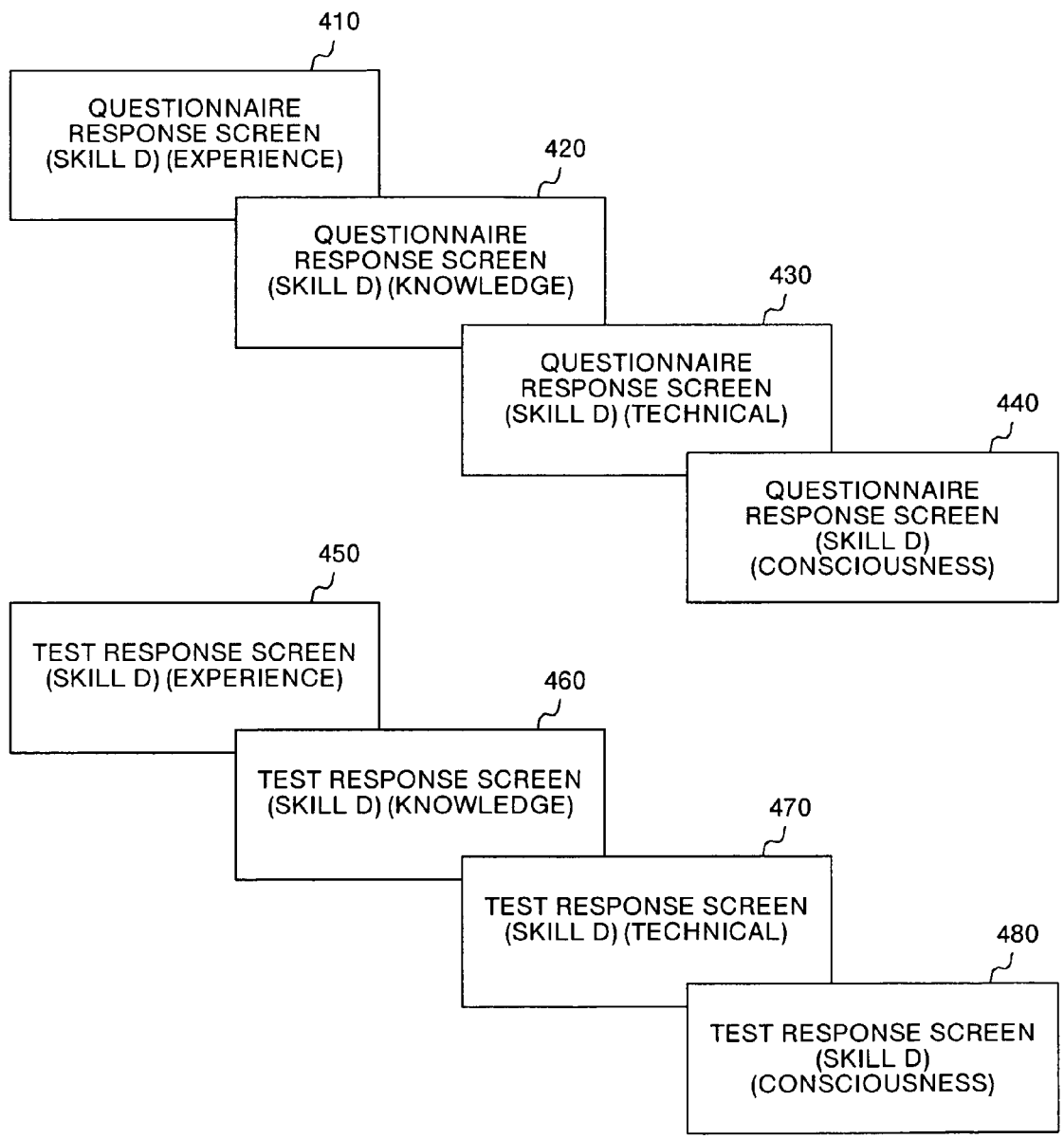
FIG. 21 is a diagram showing a transition of a questionnaire response screen and a test response screen in one embodiment.

On the other hand, in the example shown in FIG. 21, questionnaire response screens 410, 420, 430 and 440 corresponding to the skill D (experience, knowledge, technical skill, consciousness) are sequentially displayed. The questionnaires in these questionnaire response screens 410 and the like correspond to the above-described questionnaire information. The trainee responds in a selection format to the respective questionnaires on the above-described test response screens 410, 420, 430 and 440.

Moreover, in the example shown in FIG. 21, test response screens 450, 460, 470 and 480 corresponding to the skill D (experience, knowledge, technical skill, consciousness) are sequentially displayed. The test questions in these test response screens 450 and the like correspond to the above-described test question information. Here, one example of the test response screen 480 is shown in FIG. 22. The test response screen 480 shown in FIG. 22 is a screen where test questions and answer candidates for objectively analyzing the skill D (consciousness) of the trainee is displayed. The trainee responds in a selection format to the respective test questions on the above-described test response screens 450, 460, 470 and 480.

In step SA8, the questionnaire response section 36 and the test response section 37 stores the response results of the questionnaire and the test (step SA7) in the questionnaire response database 130 (see FIG. 2D) and the test response database 140 (see FIG. 3A).

Figure 7B:
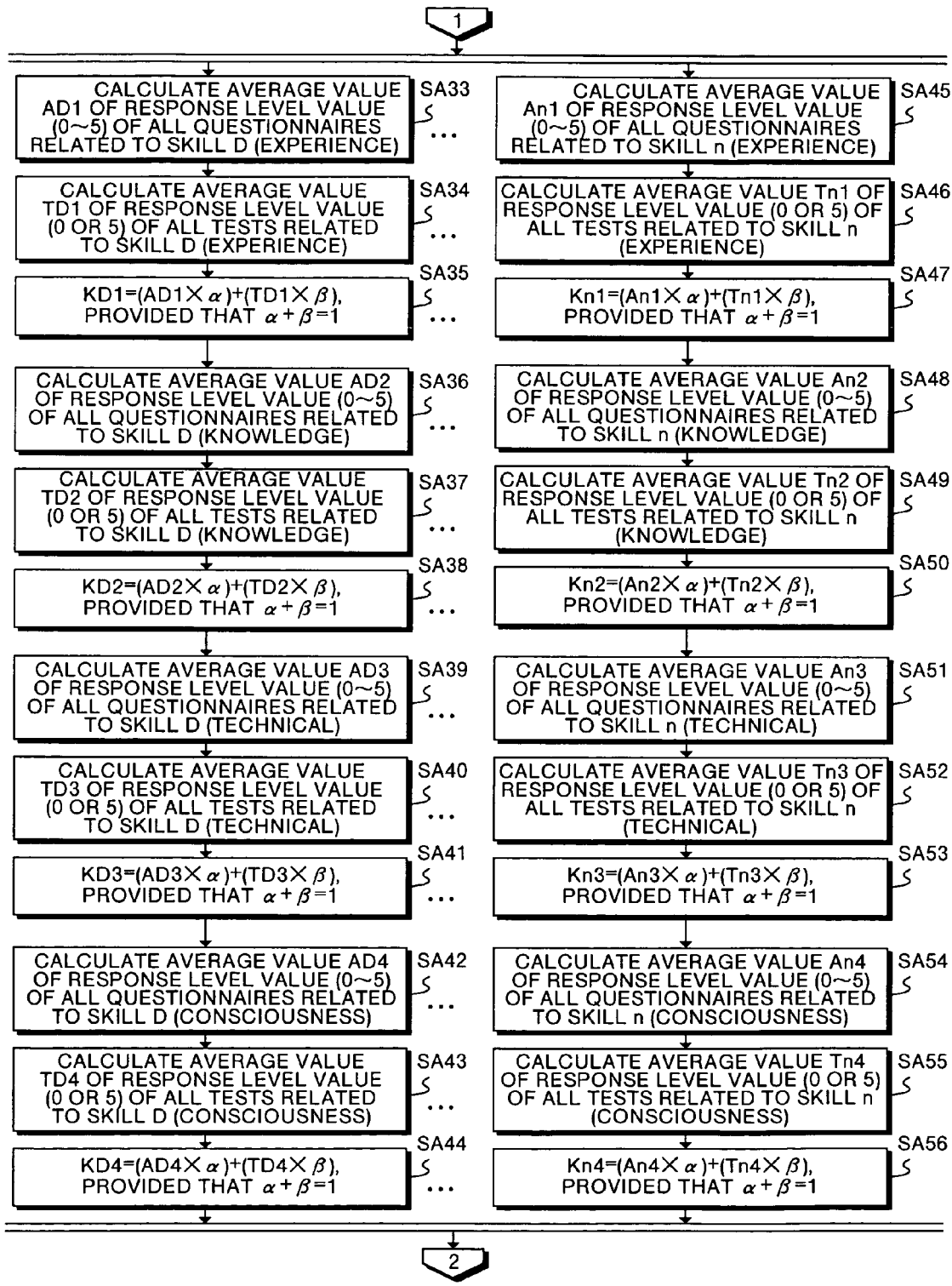

Then, as shown in FIG. 7A, the skill analysis section 38 executes in parallel the summing up processing (summing up of questionnaire and test response results for each skill) respectively corresponding to the skill A (step SA9 to step SA20), skill C (step SA21 to step SA32), as shown in FIG. 7B, skill D (step SA33 to SA44), skill n (step SA45 to step SA56). These summing up processing is executed in parallel by the number of skills corresponding to the questionnaire and test selected in step SA5.

Here, the summing up processing related to skill C (step SA21 to step SA32) will be described in detail as an example. In step SA21, the skill analysis section 38 obtains data of all response level values corresponding to skill code=skill C, skill element code=experience, from the questionnaire response database 130 (see FIG. 2D), to calculate the average value AC1 of these response level values.

In step SA22, the skill analysis section 38 obtains data of all response level values corresponding to skill code=skill C, skill element code=experience, from the test response database 140 (see FIG. 2A), to calculate the average value TC1 of these response level values. In step SA23, the skill analysis section 38 calculates the skill C experience total value KC1 as the summing up result of the response level values related to the skill C (experience), from the following equation (1):

$$KC1=(AC1\times\alpha)+(TC1\times\beta) \qquad (1)$$

wherein, the coefficient $\alpha$+the coefficient $\beta$=1, and the skill C experience total value KC1 is rounded off.

The coefficient $\alpha$ in equation (1) is a coefficient for weighting the response result of the questionnaire with respect to the skill C experience total value KC1, and the coefficient $\beta$ is a coefficient for weighting the response result of the test in the skill C experience total value KC1. The skill analysis section 38 stores the data of the above skill C experience total value KC1 in the skill/standard model comparison database 150 (see FIG. 3B)

In step SA24, the skill analysis section 38 obtains data of all response level values corresponding to skill code=skill C, skill element code=knowledge, from the questionnaire response database 130 (see FIG. 2D), to calculate the average value AC2 of these response level values.

In step SA25, the skill analysis section 38 obtains data of all response level values corresponding to skill code=skill C, skill element code=knowledge, from the test response database 140 (see FIG. 2A), to calculate the average value TC2 of these response level values. In step SA26, the skill analysis section 38 calculates the skill C knowledge total value KC2 as the summing up result of the response level values related to the skill C (knowledge), from the following equation (2):

$$KC2=(AC2\times\alpha)+(TC2\times\beta) \qquad (2)$$

wherein, the coefficient $\alpha$+the coefficient $\beta$=1, and the skill C knowledge total value KC2 is rounded off.

The coefficient $\alpha$ in equation (2) is a coefficient for weighting the response result of the questionnaire with respect to the skill C knowledge total value KC2, and the coefficient $\beta$ is a coefficient for weighting the response result of the test in the skill C knowledge total value KC2. The skill analysis section 38 stores the data of the above skill C knowledge total value KC2 in the skill/standard model comparison database 150 (see FIG. 3B).

In step SA27, the skill analysis section 38 obtains data of all response level values corresponding to skill code=skill C, skill element code=technical skill, from the questionnaire response database 130 (see FIG. 2D), to calculate the average value AC3 of these response level values.

In step SA28, the skill analysis section 38 obtains data of all response level values corresponding to skill code=skill C, skill element code=technical skill, from the test response database 140 (see FIG. 2A), to calculate the average value TC3 of these response level values. In step SA29, the skill analysis section 38 calculates the skill C technical skill total value KC3 as the summing up result of the response level values related to the skill C (technical skill), from the following equation (3):

$$KC3=(AC3\times\alpha)+(TC3\times\beta) \qquad (3)$$

wherein, the coefficient $\alpha$+the coefficient $\beta$=1, and the skill C technical skill total value KC3 is rounded off.

The coefficient $\alpha$ in equation (3) is a coefficient for weighting the response result of the questionnaire with respect to the skill C technical skill total value KC3, and the coefficient $\beta$ is a coefficient for weighting the response result of the test in the skill C technical skill total value KC3. The skill analysis section 38 stores the data of the above skill C technical skill total value KC3 in the skill/standard model comparison database 150 (see FIG. 3B).

In step SA30, the skill analysis section 38 obtains data of all response level values corresponding to skill code=skill C, skill element code=consciousness, from the questionnaire response database 130 (see FIG. 2D), to calculate the average value AC4 of these response level values.

In step SA31, the skill analysis section 38 obtains data of all response level values corresponding to skill code=skill C, skill element code=consciousness, from the test response database 140 (see FIG. 2A), to calculate the average value TC4 of these response level values. In step SA32, the skill analysis section 38 calculates the skill C consciousness total value KC4 as the summing up result of the response level values related to the skill C (consciousness), from the following equation (4):

$$KC4=(AC4\times\alpha)+(TC4\times\beta) \qquad (4)$$

wherein, the coefficient α+the coefficient β=1, and the skill C consciousness total value KC4 is rounded off.

The coefficient α in equation (4) is a coefficient for weighting the response result of the questionnaire with respect to the skill C consciousness total value KC4, and the coefficient β is a coefficient for weighting the response result of the test in the skill C consciousness total value KC4. The skill analysis section 38 stores the data of the above skill C consciousness total value KC4 in the skill/standard model comparison database 150 (see FIG. 3B).

Figure 8A:
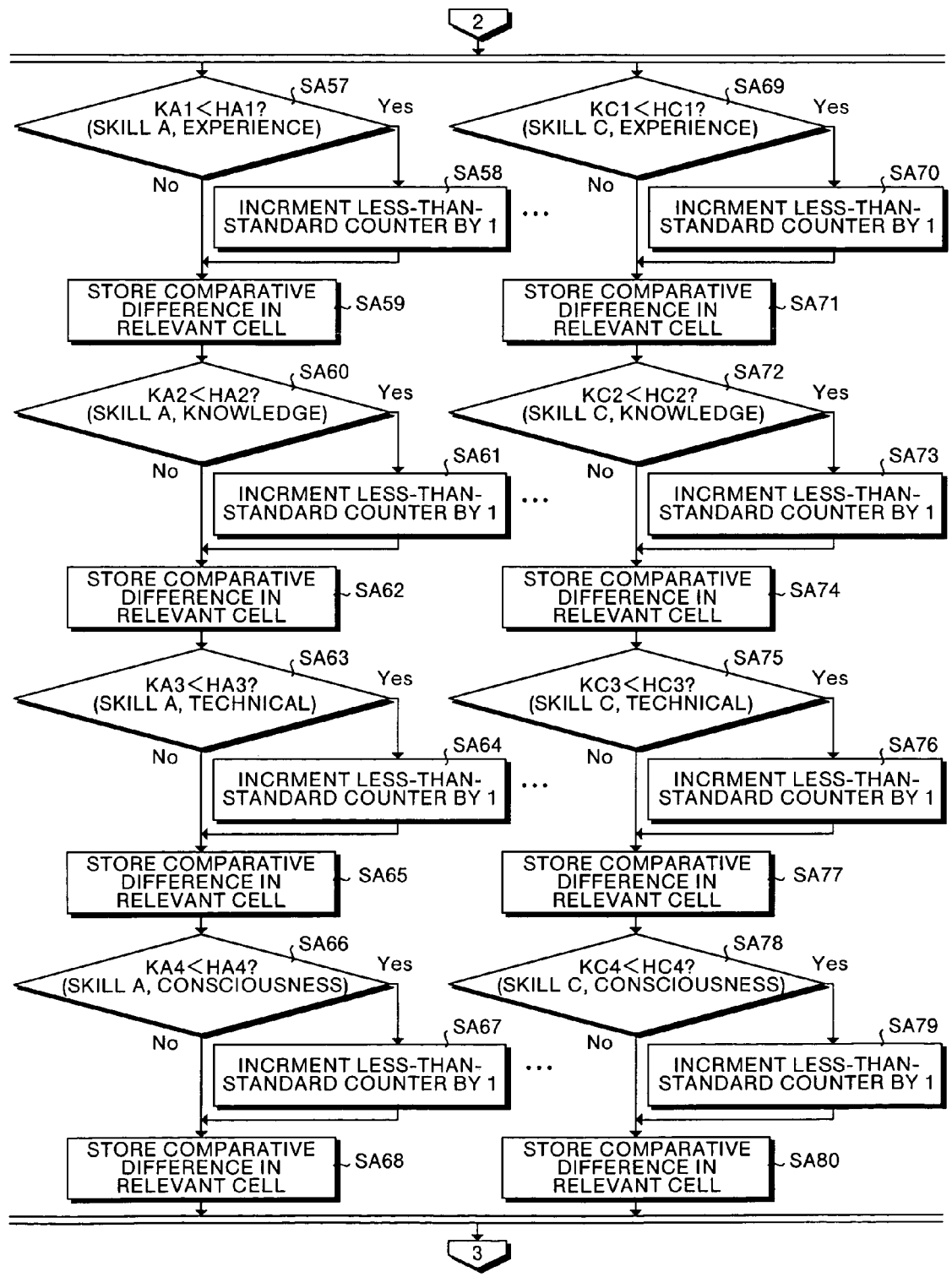
FIG. 8A and FIG. 8B show a flowchart for explaining the operation in one embodiment.
Figure 8B:
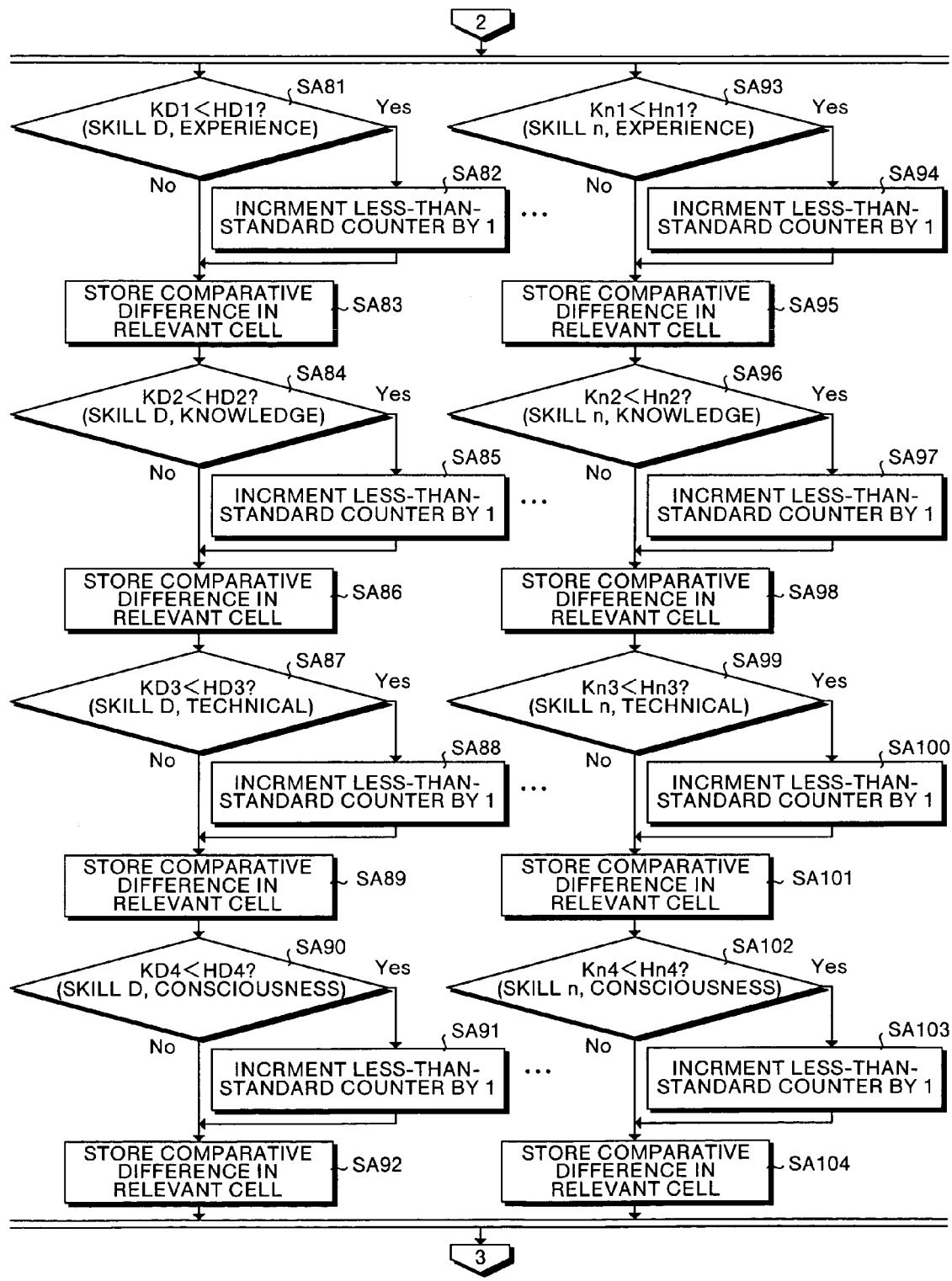

When the above-described summing up processing is completed, the skill analysis section 38 executes in parallel the comparison processing, respectively, corresponding to the skill A (step SA57 to step SA68), skill C (step SA69 to step SA80)(see FIG. 8A), skill D (step SA81 to SA92), skill n (step SA93 to step SA104) (see FIG. 8B).

The comparison processing is a processing for comparing the result of the above-described summing up processing (for example, skill A knowledge total value) and a standard value corresponding to a talent image having a talent image code J1 and grade code G1 (for example, skill A knowledge standard value), and is executed in parallel by the number of skills corresponding to the questionnaire and test selected in step SA5.

Specifically, the processing in from step SA57 to step SA68 is a processing for comparing the skill A experience total value KA1, skill A knowledge total value KA2, skill A technical skill total value KA3 and skill A consciousness total value KA4 with the skill A experience standard value HA1, skill A knowledge standard value HA2, skill A technical skill/standard value HA3 and skill A consciousness standard value HA4 corresponding to the talent image having the talent image code J1 and grade code G1.

The processing in from step SA69 to step SA80 is a processing for comparing the skill C experience total value KC1, skill C knowledge total value KC2, skill C technical skill total value KC3 and skill C consciousness total value KC4 with the skill C experience standard value HC1, skill C knowledge standard value HC2, skill C technical skill/ standard value HC3 and skill C consciousness standard value HC4 corresponding to the talent image having the talent image code J1 and grade code G1.

The processing in from step SA81 to step SA92 is a processing for comparing the skill D experience total value KD1, skill D knowledge total value KD2, skill D technical skill total value KD3 and skill D consciousness total value KD4 with the skill D experience standard value HD1, skill D knowledge standard value HD2, skill D technical skill/ standard value HD3 and skill D consciousness standard value HD4 corresponding to the talent image having the talent image code J1 and grade code G1.

The processing in from step SA93 to step SA104 is a processing for comparing the skill n experience total value Kn1, skill n knowledge total value Kn2, skill n technical skill total value Kn3 and skill n consciousness total value Kn4 with the skill n experience standard value Hn1, skill n knowledge standard value Hn2, skill n technical skill/standard value Hn3 and skill n consciousness standard value Hn4 corresponding to the talent image having the talent image code J1 and grade code G1.

Here, the summing up processing related to skill C (step SA69 to step SA80) will be described in detail as an example. In step SA69, the skill analysis section 38 obtains data of skill C experience total value KC1 from the skill/ standard model comparison database 150 (see FIG. 3B), and obtains the skill C experience standard value HC1 corresponding to the talent image code J1 and grade code G1 from the standard model database 160 (see FIG. 3C).

Then, the skill analysis section 38 judges whether the skill C experience total value KC1 is less than the skill C experience standard value HC1 or not, and if this judgment result is "No", the skill analysis section 38 executes the processing in step SA71. On the other hand, if this judgment result is "Yes", the skill analysis section 38 increments a less-than-standard counter (not shown) by 1, in step SA70.

In step SA71, the skill analysis section 38 stores the data of the comparative difference between the skill C experience total value KC1 and the skill C experience standard value HC1 in the relevant cell in the skill comparative difference table 152 (in this case, a cell of skill C experience comparative difference corresponding to the talent image code J1 and grade code G1.

In step SA72, the skill analysis section 38 obtains data of skill C knowledge total value KC2 from the skill/standard model comparison database 150 (see FIG. 3B), and obtains the skill C knowledge standard value HC2 corresponding to the talent image code J1 and grade code G1 from the standard model database 160 (see FIG. 3C).

Then, the skill analysis section 38 judges whether the skill C knowledge total value KC2 is less than the skill C knowledge standard value HC2 or not, and if this judgment result is "No", the skill analysis section 38 executes the processing in step SA74. On the other hand, if this judgment result is "Yes", the skill analysis section 38 increments the less-than-standard counter by 1, in step SA73.

In step SA74, the skill analysis section 38 stores the data of the comparative difference between the skill C knowledge total value KC2 and the skill C knowledge standard value HC2 in the relevant cell in the skill comparative difference table 152 (in this case, a cell of skill C knowledge comparative difference corresponding to the talent image code J1 and grade code G1).

In step SA75, the skill analysis section 38 obtains data of skill C technical total value KC3 from the skill/standard model comparison database 150 (see FIG. 3B), and obtains the skill C technical standard value HC3 corresponding to the talent image code J1 and grade code G1 from the standard model database 160 (see FIG. 3C).

Then, the skill analysis section 38 judges whether the skill C technical total value KC3 is less than the skill C technical standard value HC3 or not, and if this judgment result is "No", the skill analysis section 38 executes the processing in step SA77. On the other hand, if this judgment result is "Yes", the skill analysis section 38 increments the less-than-standard counter by 1, in step SA76.

In step SA77, the skill analysis section 38 stores the data of the comparative difference between the skill C technical total value KC3 and the skill C technical standard value HC3 in the relevant cell in the skill comparative difference table 152 (in this case, a cell of skill C technical comparative difference corresponding to the talent image code J1 and grade code G1).

In step SA78, the skill analysis section 38 obtains data of skill C consciousness total value KC4 from the skill/standard model comparison database 150 (see FIG. 3B), and obtains the skill consciousness standard value HC4 corresponding to the talent image code J1 and grade code G1 from the standard model database 160 (see FIG. 3C).

Then, the skill analysis section 38 judges whether the skill C consciousness total value KC4 is less than the skill C consciousness standard value HC4 or not, and if this judgment result is "No", the skill analysis section 38 executes the processing in step SA80. On the other hand, if this judgment result is "Yes", the skill analysis section 38 increments the less-than-standard counter by 1, in step SA79.

In step SA80, the skill analysis section 38 stores the data of the comparative difference between the skill C consciousness total value KC4 and the skill C consciousness standard value HC4 in the relevant cell in the skill comparative difference table 152 (in this case, a cell of skill C consciousness comparative difference corresponding to the talent image code J1 and grade code G1).

Figure 9:
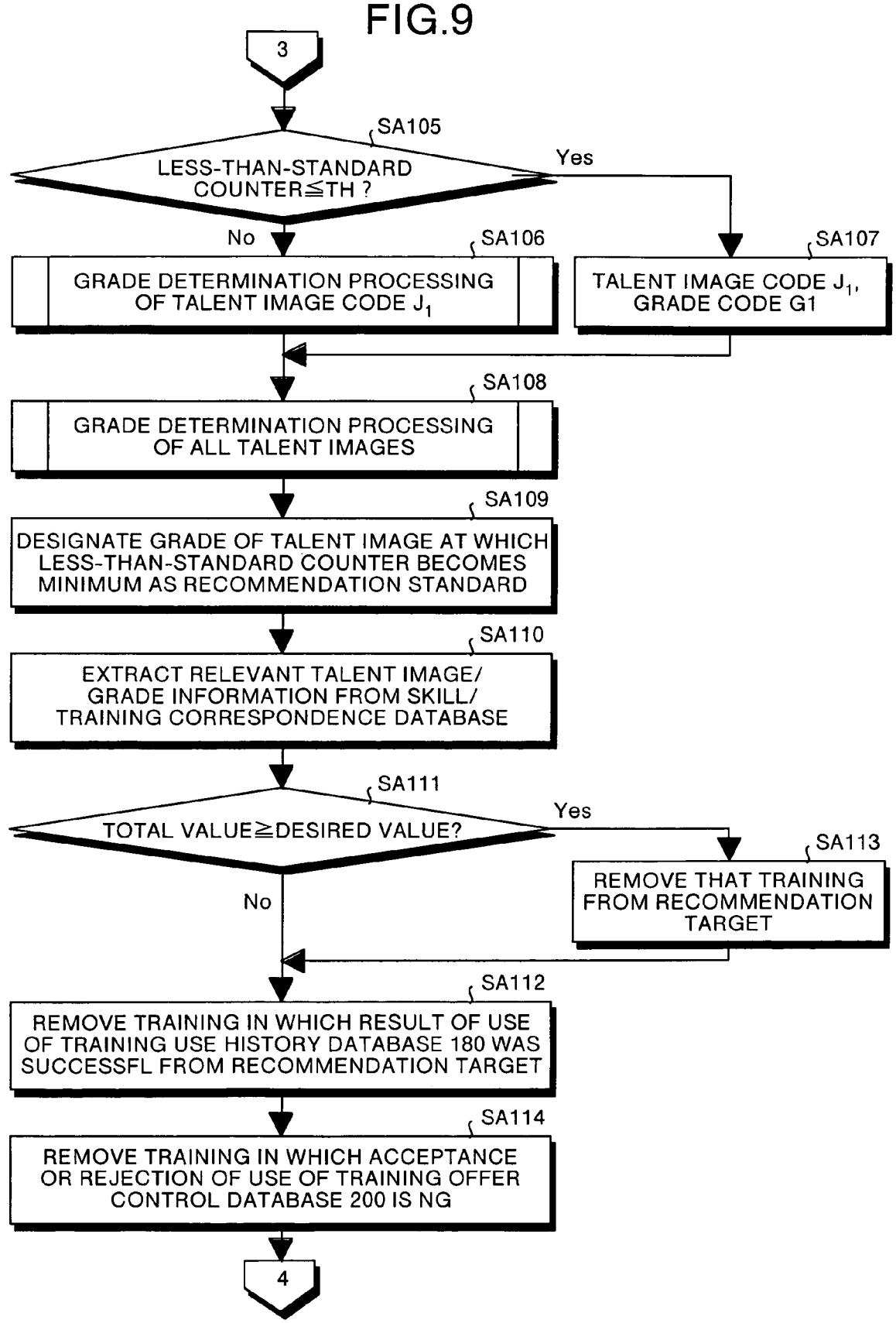
FIG. 9 is a flowchart for explaining the operation in one embodiment.

When the above-described processing is completed, the skill analysis section 38 judges whether the value of the less-than-standard counter is equal to or smaller than the specified value TH or not, in step SA105 shown in FIG. 9. If this judgment result is "Yes", the skill analysis section 38 decides the grade code G1 with regard to the talent image having the talent image code J1, in step SA107.

On the other hand, if the judgment result in step SA105 is "No", the skill analysis section 38 executes, in step SA106, the above-described parallel processing (step SA57 to step SA104) with respect to the grade code G2 to G(m−1), respectively, related to the talent image code J1. As a result, when all values of the less-than-standard counter exceed the specified value, the least significant grade code Gm is decided with respect to the talent image having the talent image code J1.

In step SA108, the grade is decided with respect to respective talent images having the talent image codes J2 to Js, in the similar manner as in the processing in the above-described step SA57 to step SA107. In step SA109, the skill analysis section 38 designates the grade (grade code) of a talent image (talent image code), whose less-than-standard counter value becomes the smallest value, as a recommended standard. In step SA110, the training selection section 39 extracts the information of the relevant all training codes and the desired value from the skill/training correspondence database 170 shown in FIG. 4A, using the talent image code and the grade code as a key.

In step SA111, the training selection section 39 judges if the respective total values of the skill total value table 151 (see FIG. 3B) related to the concerned trainee, in the unit of training code, is equal to or larger than the desired value extracted in step SA110 or not, in the unit of skill and skill element. Here, if the all total values are equal to or larger than the desired value, with regard to a certain training code, the training selection section 39 makes the judgment result in step SA111 as "Yes". In step SA113, the training corresponding to the above training code is removed from the recommendation target.

On the other hand, if the judgment result in step SA11 is "No", the training selection section 39 refers the training use history database 180 (see FIG. 4B) to remove the training, in which "result of use" is "passed", from the recommendation target, in step SA112. In step SA114, the training selection section 39 refers the training offer control database 200 (see FIG. 5) to remove the training, in which "acceptance or rejection of use" is "NG", from the recommendation target. That is to say, one other than the trainings removed by the training selection section 39 is the training recommended as the optimum training based on the result of objectively analyzing the skill of the trainee, talent image and grade.

Figure 10:
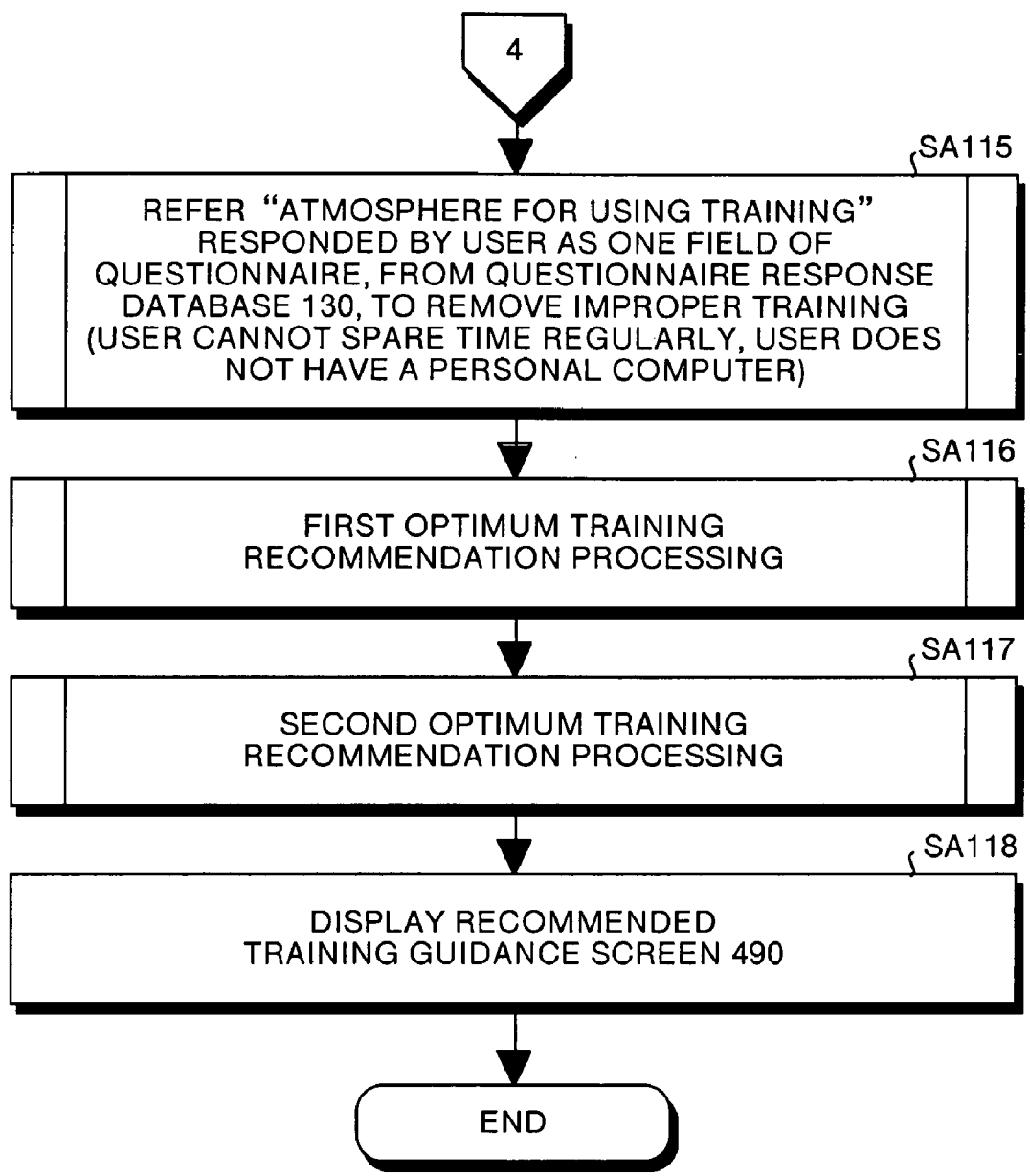
FIG. 10 is a flowchart for explaining the operation in one embodiment.
Figure 11:
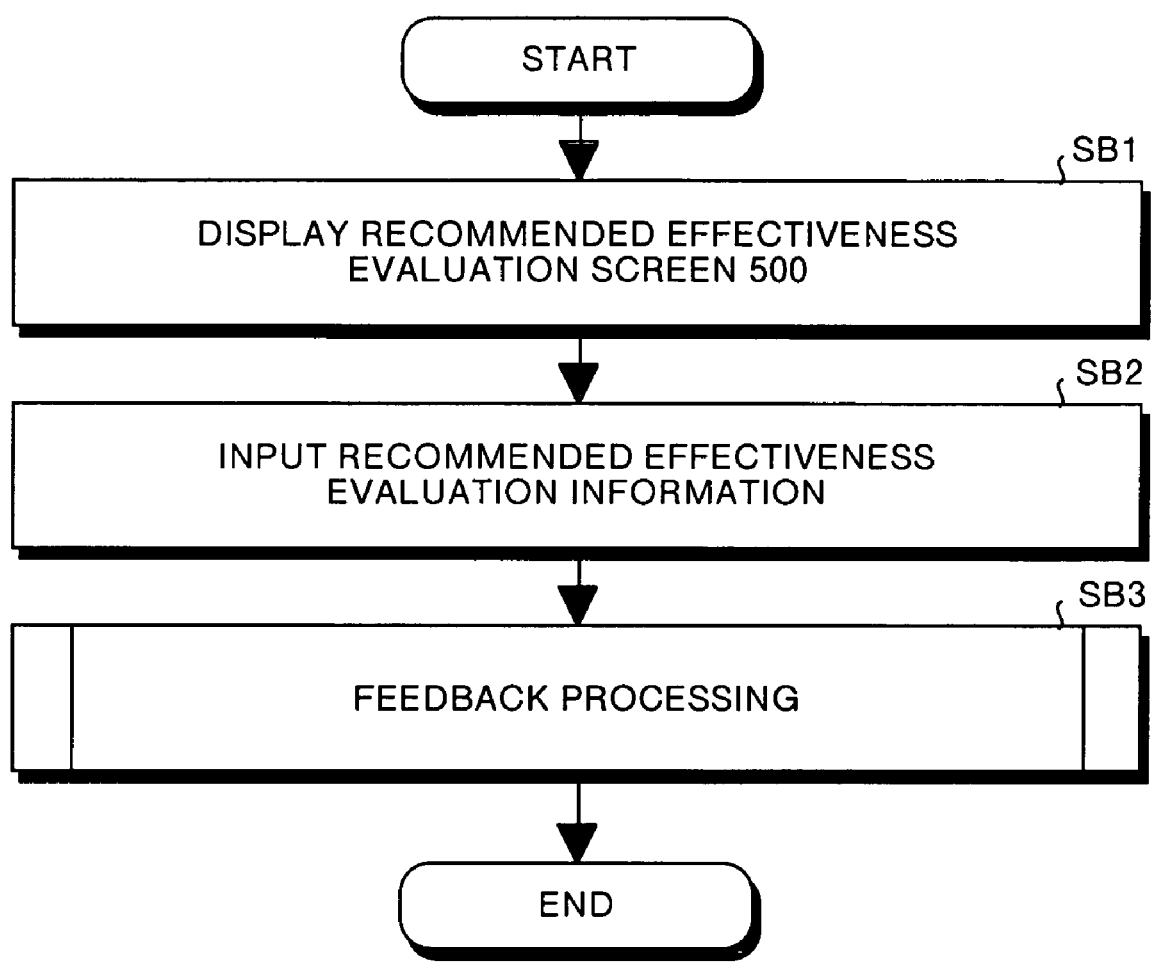
FIG. 11 is a flowchart for explaining the operation in one embodiment.

Here, the processing of from step SA115 to step SA117 shown in FIG. 10 is skipped. In step SA118, the recommended training guidance section 40 extracts the training guidance information related to the training recommended as the optimum training selected by the training selection section 39 from the training contents information database 190 (see FIG. 4C), using the training code as a key.

Then, the recommended training guidance section 40 displays the training guidance information related to the relevant training on a display of client $10_1$, as the recommended training guidance screen 490 shown in FIG. 23, in the order of the smallest absolute value of the difference between the total value and the desired value, among the trainings related to the skill and element having the largest absolute value between the total value and the desired value. As a result, the trainee can use the training recommended as most suitable, in accordance with the display contents on the recommended training guidance screen 490.

When completing the training, the trainee operates the client $10_1$ to access the server 30. Thereby, in step SB1 shown in FIG. 11, the recommended effectiveness evaluation section 41 displays the recommended effectiveness evaluation screen 500 shown in FIG. 24 on the display of client $10_1$. This recommended effectiveness evaluation screen 500 is a screen for asking the trainee who used the recommended training to evaluate the effectiveness of the training for each skill element (experience, knowledge, technical skill, consciousness). In the evaluation, the degree of the training is selected from three choices, "too high", "adequate", and "too low" for the trainee (recommended effectiveness evaluation information).

In step SB2, the trainee inputs the recommended effectiveness evaluation information in accordance with the recommended effectiveness evaluation screen 500. In step SB3, the recommended effectiveness evaluation section 41 executes a processing for feeding back the recommended effectiveness evaluation information to the skill/training correspondence database 170.

Specifically, the recommended effectiveness evaluation section 41 decreases the desired value of the relevant skill element corresponding to the training that the trainee used and the skill of the trainee by 0.01, with respect to the skill element in which the recommended effectiveness evaluation information has been evaluated as "too low". Therefore, when there are 100 cases where the recommended effectiveness evaluation information has been evaluated as "too low" with regard to a certain skill element, the desired value of the skill element decreases by 1.0. As a result, hereinafter, that training is unlikely to be recommended to the trainees having high total value, and hence, the effectiveness of the training recommendation is improved.

On the other hand, the recommended effectiveness evaluation section 41 increases the desired value of the relevant skill element corresponding to the training that the trainee used and the skill of the trainee by 0.01, with respect to the skill element in which the recommended effectiveness evaluation information has been evaluated as "too high". Therefore, when there are 100 cases where the recommended effectiveness evaluation information has been evaluated as "too high" with regard to a certain skill element, the desired value of the skill element increases by 1.0. As a result, hereinafter, that training is unlikely to be recommended to the trainees having low total value, and hence, the effectiveness of the training recommendation is improved.

In one embodiment, step SA115 to step SA117 shown in FIG. 10 may be executed as the processing of recommending the optimum training in the training selection section 39. That is to say, step SA115 is a processing of recommending the optimum training, taking the environment for using the training of the trainee into consideration. In this case, the server 30 displays the questionnaire response screen 325 shown in FIG. 15 on the client $10_1$, to investigate the environment for using the training (timewise environment, existence of a personal computer, or the like) of the trainee.

In step SA115, the training selection section 39 compares the questionnaire response obtained by the questionnaire response screen 325 (for example, user cannot spare predetermined time regularly for training, user does not have a personal computer for training, etc.) with the training contents information database 190 (see FIG. 4C), to thereby remove the training that the trainee cannot use substantially (for example, training performed regularly within predetermined time, or training requiring a personal computer) from the optimum recommended training.

Moreover, in step SA116, a first optimum training recommendation processing is performed, which recommends training for increasing the skill level of the trainee instantly, for example, from 2 to 4. That is to say, the training recommended here is a challenging training aiming at rapid level up. Specifically, the training selection section 39 recommends, as challenging recommended training, training having a large absolute value of the difference (–1,–2,–3,) between the total value (see the skill total value table 151 (FIG. 3B) and the desired value (see the skill table 172 (FIG. 4A), judging similarly as in step SA111.

In this case, the challenging recommended training guidance screen 510 shown in FIG. 26 is displayed on the display of client $10_1$. On this challenging recommended training guidance screen 510, there are displayed a guidance of the optimum recommended training corresponding to the objective skill of the trainee ("xx design workshop") and a guidance of a challenging recommended training ("xx design triathlon by lodging together"). When wishing to use the training effectively and reasonably, the trainee uses the optimum recommended training, and on the other hand, when wishing instant level up, the trainee uses the challenging recommended training.

Furthermore, in step SA117, a second optimum training recommendation processing is performed, which recommends training in a field related to the trainee. That is to say, the second optimum training recommendation processing is for planning expansion of the field, such that in addition to the training matching the objective skill of the trainee, training in a field related to the trainee is also recommended.

Specifically, the training selection section 39 recommends, as relevant field recommended training, training in the order of having the smallest absolute value of the difference (–1,–2,–3,) between the total value (see the skill total value table 151 (FIG. 3B) and the desired value (see the skill table 172 (FIG. 4A), among the trainings related to skill and elements having a small absolute value between the total value and the standard value, judging similarly as in step SA111.

In this case, the relevant field recommended training guidance screen 520 shown in FIG. 25 is displayed on the display of client $10_1$. On this relevant field recommended training guidance screen 520, there are displayed the content of the optimum recommended training corresponding to the objective skill of the trainee ("xx design workshop") and a guidance of the relevant field recommended training ("xx build-up workshop"). When wishing to use the training in the preferential field, the trainee uses the optimum recommended training, and if wishing to increase the skill in the relevant field, the trainee uses the relevant field recommended training.

As described above, according to this embodiment, the skill information of a trainee is collected via a network by a questionnaire and test method, to objectively analyze the skill trend and talent image of the trainee, based on the comparison result of the total value of the skill information and the standard value of the standard model database 160, and training that suits to the trainee is selected as the optimum training, based on the analysis result. As a result, the optimum training can be recommended to the trainee, and the outcome of the training can be improved.

Moreover, since the effectiveness evaluation information is collected from the trainee after having finished the training, and this effectiveness evaluation information is fed back to the standard value of the standard model database 160, the reliability of the standard value increases, and the recommendation accuracy of the optimum training can be increased.

In addition, since challenging recommended training (see FIG. 26) is recommended in addition to the optimum recommended training, level up of the trainee can be accelerated, and the selection range of training by the trainee can be expanded, thereby enabling increase in freedom of the trainee.

Furthermore, since the relevant field recommended training is recommended in addition to the optimum recommended training, trainee's skill can be expanded not only to the optimum field but also to the relevant field, thereby enabling expansion of the trainee's skill.

A preferred embodiment of this invention has been described above, with reference to the drawings, but the specific configuration example is not limited to this embodiment, and design changes without departing from the gist of the present invention are included within the present invention. For example, in the above-described embodiment, the optimum training recommendation program for realizing the function of the server 30 may be recorded in a computer readable recording medium 700, to realize the function of the server 30 by reading the optimum training recommendation program that has been recorded in the recording medium 700 by the computer 600 and executing the program.

Figure 27:
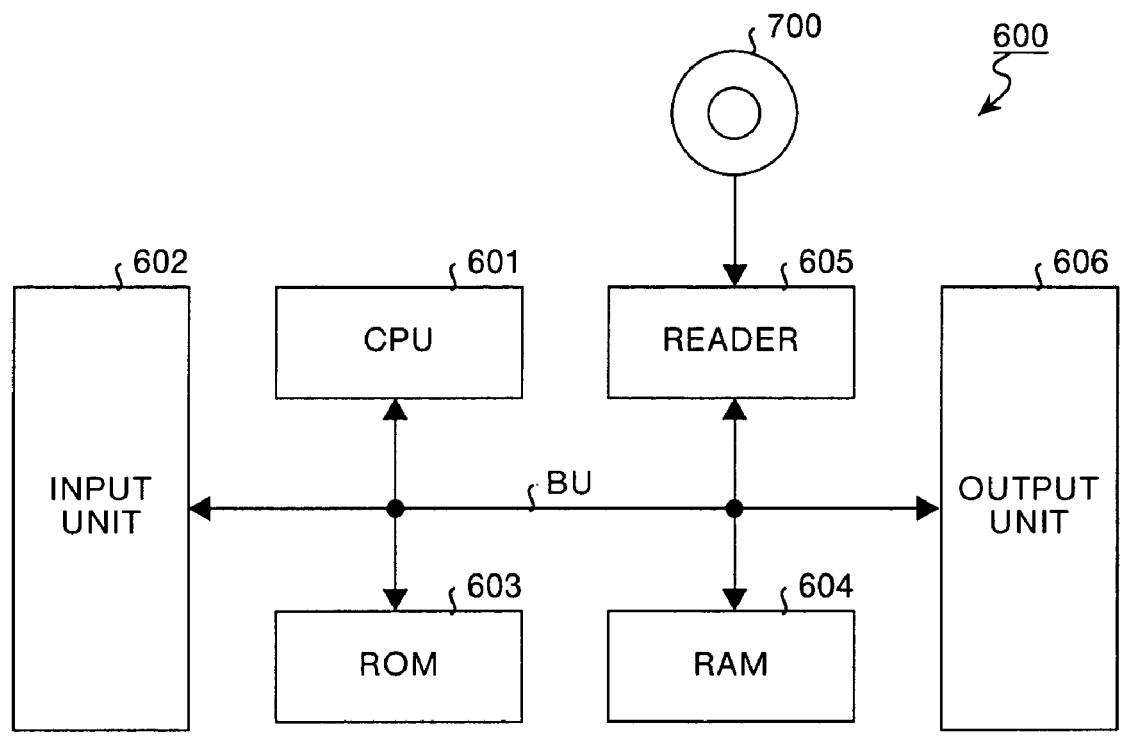
FIG. 27 is a block diagram showing a modification example in one embodiment.

The computer 600 shown in FIG. 27 comprises a CPU 601 for executing the optimum training recommendation program, an input unit 602 such as a keyboard, mouse or the like, a ROM (Read Only Memory) 603 which stores various data, a RAM (Random Access Memory) 604 which stores arithmetic parameters and the like, a reader 605 for reading the optimum training recommendation program from the recording medium 700, an output unit 606 such as a display, printer or the like, and a bus BU for connecting respective units.

The CPU 601 performs processing for the above-described optimum training recommendation by executing the optimum training recommendation program, after having read the optimum training recommendation program recorded in the recording medium 700 via the reader 605. Here, the recording medium 700 includes not only portable recording media such as optical disk, floppy disk, hard disk or the like, but also a transmission medium for temporarily storing and holding the data like a network.

Moreover, a case where the present invention is applied to the employee training of one company has been described, but the range of information registered in the user s basic information database 100, the skill/standard model comparison database 150, the standard model database 160, skill/training correspondence database 170, the training use history database 180, the training contents information database 190 and the training offer control database 200 may be expanded to the information outside the company.

In this case, talents outside the company and the information related to the training has only to be registered from clients outside the company, in accordance with a predetermined format. The client outside the company can access the server 30, to use a service that the above-described optimum training is recommended.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for recommending an optimum training to a user, comprising:
    a first database storing basic user information comprising personal identification information of the user and latest dates on which the user responded to questionnaires and tests related to a plurality of skills;
    an identifying unit configured to identify the user based on personal identification information entered by the user and the basic user information;
    a selecting unit configured to display the latest dates corresponding to the identified user and to receive a selection of the questionnaires and tests the user selects based on the latest dates;
    a second database storing information related to the questionnaires and tests corresponding to the skills;
    a formulating unit configured to display the questionnaires and tests selected by the user based on the selection and information in the second database;
    a responding unit configured to receive from the user answers to the questionnaires and tests displayed;
    a third database storing, as numerical values corresponding to the user, results of the questionnaires and tests responded to by the user based on the answers;
    a fourth database storing standard values indicating skill levels required for each of a plurality of grades respectively corresponding to each of a plurality of different talent images;
    an analyzing unit configured to compare the numerical values and the standard values, and to determine a grade for each of the talent images for the user based on a result of the comparison;
    a fifth database storing the standard values and training information corresponding to each of the grades;
    a sixth database storing information related to training that the user has previously received;
    a training selecting unit configured to extract training to recommend to the user based on information in the fifth database and in the sixth database and a result of the determination made by the analyzing unit; and
    an evaluating unit configured to receive an effectiveness of the training evaluated by the user after the user has finished the training and to change the standard values stored in the fifth database based on the effectiveness.

2. A computer-implemented method of recommending an optimum training to a user, comprising:
    storing basic user information comprising personal identification information of the user and latest dates on which the user responded to questionnaires and tests related to a plurality of skills;
    identifying the user based on personal identification information entered by the user and the basic user information;
    displaying the latest dates corresponding to the identified user and receiving a selection of the questionnaires and tests the user selects based on the latest dates;
    storing information related to the questionnaires and tests corresponding to the skills;
    displaying the questionnaires and tests selected by the user based on the selection and the information related to the questionnaires and tests corresponding to the skills;
    receiving from the user answers to the questionnaires and tests displayed;
    storing, as numerical values corresponding to the user, results of the questionnaires and tests responded to by the user based on the answers;
    storing standard values indicating skill levels required for each of a plurality of grades respectively corresponding to each of a plurality of different talent images;
    comparing the numerical values and the standard values, and determining a grade for each of the talent images for the user based on a result of the comparison;
    storing the standard values and training information corresponding to each of the grades;
    storing information related to training that the user has previously received;
    extracting training to recommend to the user based on the standard values and training information corresponding to each of the grades, the information related to training the user has previously received, and a result of said determining a grade for each of the talent images for the user; and
    receiving an effectiveness of the training evaluated by the user after the user has finished the training and changing the standard values stored in the fifth database based on the effectiveness.

3. A computer-readable storage medium storing a program used to direct a processor to perform:
    storing basic user information comprising personal identification information of the user and latest dates on which the user responded to questionnaires and tests related to a plurality of skills;
    identifying the user based on personal identification information entered by the user and the basic user information;
    displaying the latest dates corresponding to the identified user and receiving a selection of the questionnaires and tests the user selects based on the latest dates;
    storing information related to the questionnaires and tests corresponding to the skills;
    displaying the questionnaires and tests selected by the user based on the selection and the information related to the questionnaires and tests corresponding to the skills;
    receiving from the user answers to the questionnaires and tests displayed;

storing, as numerical values corresponding to the user, results of the questionnaires and tests responded to by the user based on the answers;

storing standard values indicating skill levels required for each of a plurality of grades respectively corresponding to each of a plurality of different talent images;

comparing the numerical values and the standard values, and determining a grade for each of the talent images for the user based on a result of the comparison;

storing the standard values and training information corresponding to each of the grades;

storing information related to training that the user has previously received;

extracting training to recommend to the user based on the standard values and training information corresponding to each of the grades, the information related to training the user has previously received, and a result of said determining a grade for each of the talent images for the user; and receiving an effectiveness of the training evaluated by the user after the user has finished the training and changing the standard values stored in the fifth database based on the effectiveness.

* * * * *